(12) United States Patent
Sakai et al.

(10) Patent No.: US 7,644,155 B2
(45) Date of Patent: Jan. 5, 2010

(54) DATA COMMUNICATION SYSTEM AND DATA COMMUNICATION METHOD

(75) Inventors: Masashi Sakai, Kawasaki (JP); Shinichiro Aikawa, Kawasaki (JP); Yukihiro Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 11/357,129

(22) Filed: Feb. 21, 2006

(65) Prior Publication Data
US 2006/0259576 A1 Nov. 16, 2006

Related U.S. Application Data

(63) Continuation of application No. PCT/JP03/11543, filed on Sep. 10, 2003.

(51) Int. Cl.
*G06F 15/16* (2006.01)
(52) U.S. Cl. .................... 709/224; 709/203; 709/228; 707/200; 704/235
(58) Field of Classification Search ............... 709/203, 709/224, 228, 229; 704/235, 260; 707/523
See application file for complete search history.

(56) References Cited

U.S. PATENT DOCUMENTS 5,577,165 A * 11/1996 Takebayashi et al. ....... 704/275
5,625,675 A * 4/1997 Katsumaru et al. ....... 379/88.25
5,632,002 A * 5/1997 Hashimoto et al. .......... 704/231
5,956,681 A * 9/1999 Yamakita ................... 704/260
2003/0074475 A1* 4/2003 Ollikainen ................. 709/246
2006/0224793 A1* 10/2006 Purlia ......................... 710/62

FOREIGN PATENT DOCUMENTS

JP 2003-22227 1/2003

OTHER PUBLICATIONS

Japanese Patent Office Action Decision of Rejection mailed Jul. 15, 2008 for corresponding Japanese Patent Application No. 2005-508903.

* cited by examiner

*Primary Examiner*—Khanh Q Dinh
(74) *Attorney, Agent, or Firm*—Staas & Halsey

(57) ABSTRACT

A data communication system and data communication method capable of drastically improving the quality of a dynamic image service to be offered to a user. The data communication system comprises a mobile communication terminal (1-2), an application server (1-1) for fetching data open to the public on a network (1-7) in accordance with a request from the mobile communication terminal (1-2) and conducting a data rate conversion for delivery to the mobile communication terminal (1-2) and conducting data delivery and transferring the fetched data to a predetermined transferred destination, and a home server (1-5) provided in a base of a possessor of the mobile communication terminal (1-2) for receiving the data, fetched by the application server (1-1) and transferred, through the network (1-7) and accumulating the data to regenerate the data as needed.

8 Claims, 19 Drawing Sheets

DATA COMMUNICATION SYSTEM AND DATA COMMUNICATION METHOD

This application is a continuation application, filed under 35 USC 111(a), of International Application PCT/JP2003/011543, filed Sep. 10, 2003.

TECHNICAL FIELD

The present invention relates to a data communication system and a data communication method.

BACKGROUND ART

In recent years, in the field of mobile communications such as portable telephone, in addition to call services and mail services, the realization of various types of services have taken place. Of these services, in particular, an increasing development of a service using transmission/reception of dynamic images, such as video telephone between mobile communication terminals and streaming by access to the internet, is expectable in the future.

Moreover, the volume of such dynamic image data to be transmitted/received between mobile communication terminals is larger than that of still image or text data which have been used in conventional services. Still moreover, the mobile communication terminal users using services based on the transmission/reception of dynamic images between the mobile communication terminals have increased in number. For reason, the mobile communications for the above-mentioned dynamic image transmission/reception services requires an efficient delivery of communication data.

In general, in a case in which difficulty is experienced in making transmission at the original dynamic image data rate due to the restrictions such as radio band, transmission line capacity or mobile communication terminal capability, the transmission is made in a manner such that the dynamic image data forming a large volume of data in the mobile communications is converted into a lower data rate in a communicable range. In this way, the dynamic image streaming services have been offered to the mobile communication terminals. In this connection, in the mobile communication terminals which have received the dynamic image streaming, the dynamic image data has been abandoned after the execution by an application.

Since the dynamic image communication service requires a large volume of data as mentioned above, in consideration of communication facilities and communication environments, an efficient communication has been realized while decreasing the data rate. Accordingly, the quality of the dynamic image transmitted becomes lower than that of the original image. Therefore, in the case of carrying out the dynamic image service in the mobile communications, the dynamic image data is transmitted in a state where the data rate is lowered due to the restrictions such as communication facilities and communication environments, which degrades the quality of the dynamic image with respect to the original.

For offering the dynamic image service to the users, an important object is to improve the degradation of service quality stemming from the degradation of the quality of dynamic image to be offered to the mobile communication terminals in comparison with that of the original through the use of any means while maintaining the efficiency of data transmissions.

Meanwhile, there are a technique (see patent document 1) of transferring still image data taken by a camera built in a portable terminal to a device on a network carrier side and a technique (see patent document 2) of transferring HTML (HyperText Markup Language), still image data, text data or the like to an internet binder made to manage data for each account.

According to the technique written in the patent document 2, at the access through a portable telephone to a page open to the public on the internet, the information on the page is managed in the internet binder in accordance with an instruction from the portable telephone so that an MFP or user PC can receive the data held in the internet binder.

However, in the case of the technique written in the aforesaid patent document 2, since the data on the page open to the public on the internet and accessed by the portable telephone is transferred to the internet binder which is a network carrier side device designed to manage the account data, the access to the transferred data in the MFP or user PC requires an operation of inputting a user ID or password for the account authentication, and others.

That is, in the technique written in the aforesaid patent document 2, even in a case in which the MFP or user PC again receives the data once fetched, the user authentication becomes necessary. Therefore, there is still a room of improvement in view of the quality of dynamic image providing service.

The present invention has been developed in consideration of these problems, and it is an object of the invention to provide a data communication system and data communication method capable of regenerating data, once fetched by a mobile communication terminal, through the use of his/her own different terminal without conducting the user authentication, thereby drastically improving the quality of a dynamic image service to be offered to users while maintaining the efficiency of communication data including dynamic images.

Patent Document 1
Japanese Patent Laid-Open No. HEI 10-149309
Patent Document 2
Japanese Patent Laid-Open No. 2002-123461

DISCLOSURE OF THE INVENTION

For achieving the above-mentioned purpose, a data communication system according to the present invention comprises a mobile communication terminal, an application server for fetching data open to the public on a network in accordance with a request from the mobile communication terminal, conducting a data rate conversion for delivery to the mobile communication terminal and conducting data delivery, and transferring the fetched data to a predetermined transferred destination, and a home server provided in a base of a possessor of a mobile communication terminal for receiving the data, fetched by the application server and transferred, through a network and accumulating the data to regenerate the data as needed.

In addition, the application server includes a fetching unit for fetching the data open to the public on the network in accordance with a request from a mobile communication terminal, a first data rate conversion delivery unit for conducting the conversion of the data, fetched by the fetching unit, into a data rate for the delivery to the mobile communication terminal and conducting the delivery to the mobile communication terminal, and a transferring unit for transferring the data, fetched by the fetching unit, to the home server, while the home server includes an accumulation processing unit for accumulating the data, transferred from the application server, in a storage area and a regenerating unit for regenerating the data accumulated in the storage area.

In this case, it is also possible that a plurality of home servers are provided as the home server and a designation information on a home server which is a transferred destination is included in the request from the mobile communication server.

Moreover, it is also appropriate that the transferring unit of the application server includes a traffic monitoring unit for monitoring a network traffic relative to the home server, and an under-monitor transferring unit for transferring the data, fetched by the fetching unit, to the home server in accordance with a result of the monitor of the traffic relative to the home server by the traffic monitoring unit.

Still moreover, it is also appropriate that the mobile communication terminal includes a delivery request signal outputting unit for outputting, to the application server, a delivery request signal designating a location of the delivery-requested data on the network and a location of the home server which is a transferred destination, while the transferring unit transfers the data, fetched by the fetching unit, to the home server on the basis of the delivery request signal from the delivery request outputting unit of the mobile communication terminal.

Yet moreover, it is also appropriate that the application server includes a calling unit for calling the data, accumulated in the home server, in accordance with a request from the mobile communication terminal and a data rate conversion delivery unit for, upon receipt of the data called by the calling unit from the home server, conducting the data rate conversion for the delivery to the mobile communication terminal and conducting the delivery to the mobile communication terminal, while the home server includes a reply processing unit for reading out the data, called by the calling unit of the application server, from the storage area and making a reply.

Furthermore, a data communication method according to the present invention comprises a request outputting step of outputting a request for data open to the public on a network from a mobile communication terminal through an application server, a fetching delivery step of fetching the data corresponding to the request, outputted in the request outputting step, in the application server and conducting a data rate conversion on the data for the delivery to the mobile communication terminal and conducting the delivery of the data, a transferring step of transferring the data, fetched by the application server in the fetching delivery step, to a home server provided in a base of a possessor of the mobile communication terminal, and an accumulation processing step of accumulating the data, transferred in the transferring step, in a storage area of the home server.

In this case, it is also appropriate that the data communication method further comprises a regenerating step of regenerating the data accumulated in the storage area in the accumulation processing step.

In addition, it is also appropriate that, in the transferring step, the data fetched in the fetching delivery step is transferred to the home server on the basis of an instruction from the mobile communication terminal.

Still additionally, it is also appropriate that, in the transferring step, the data fetched in the fetching delivery step is transferred to the home server after a bit rate conversion in accordance with communication environments of the application server and the home server.

Yet additionally, it is also appropriate that, in the transferring step, a network traffic between the application server and the home server is monitored in the application server and the data fetched in the fetching delivery step is transferred to the home server in accordance with a result of the traffic monitor.

Moreover, it is also appropriate that data communication method further comprises a calling step of, in the application server, calling the data, accumulated in the home server in the accumulation processing step, in accordance with a request from the mobile communication terminal, a reply processing step of, in the home server, reading out the data called in the calling step from the storage area to make a reply to the application server, and a delivering step of, in the application server, upon receipt of the data of the reply by the reply processing step from the home server, conducting a data rate conversion on the reply data for the delivery to the mobile communication terminal and conducting the delivery to the mobile communication terminal.

Thus, the data communication system and data communication method according to the present invention can provide the following effects and advantages.

(1) Since a home server placed on a base of a possessor of a mobile communication terminal receives and accumulates data fetched by an application server and transmitted so as to reproduce the data as needed, it is possible to reproduce the data, once fetched by the mobile communication terminal, from a home server which is a his/her own different terminal without conducting the user authentication, which can provide an advantage that the quality of a dynamic image service to be offered to a user is drastically improvable while maintaining the efficiency of communication data including dynamic images.

(2) Since the calling unit of the application server calls or accesses the data accumulated in the home server in accordance with a request from the mobile communication terminal and the reply processing unit of the home server reads out the data called by the calling unit from the storage area and makes a reply and, upon receipt of the data called by the calling unit from the home server, the data rate conversion delivery unit of the application server carries out the data rate conversion for the delivery for the mobile communication terminal and performs the delivery to the mobile communication terminal, the data once fetched by the mobile communication terminal can be backed up into his/her own home server, which can eliminate the need for conducting the user authentication and others at the access in the home server. In addition, since even the mobile communication terminal is accessible to the backed-up data accumulated in the home server, the user authentication needed for the access to the backed-up data accumulated in a management server of a mobile communication carrier or the like is omissible in the mobile communication terminal, which contributes greatly to the user's convenience.

In addition, even in a case in which difficulty is experienced in receiving dynamic image data with a sufficiently high quality or necessary information because of poor mobile communication environments, the receiver can receive the original dynamic image data from the data source at an arbitrary timing without degrading the quality thereof after a change to a good situation of communication environment.

(3) In a case in which a plurality of dynamic image data managed in the data source, which are objects of request, exist according to the magnitude of bit rate, the application server can make a request for the delivery of the dynamic image data with the highest bit rate irrespective of the communication environment and capability of the data request outputting terminal so that the data source, which is a transmitter, can transmit the data without paying attention to the communication environments of the mobile communication terminal, which is a receiver, and the home server, the terminal capability, and others.

BEST MODE FOR CARRYING OUT THE INVENTION

(a) Description of Embodiment of the Present Invention

An embodiment of the present invention will be described hereinbelow with reference to the drawings.

Figure 1:
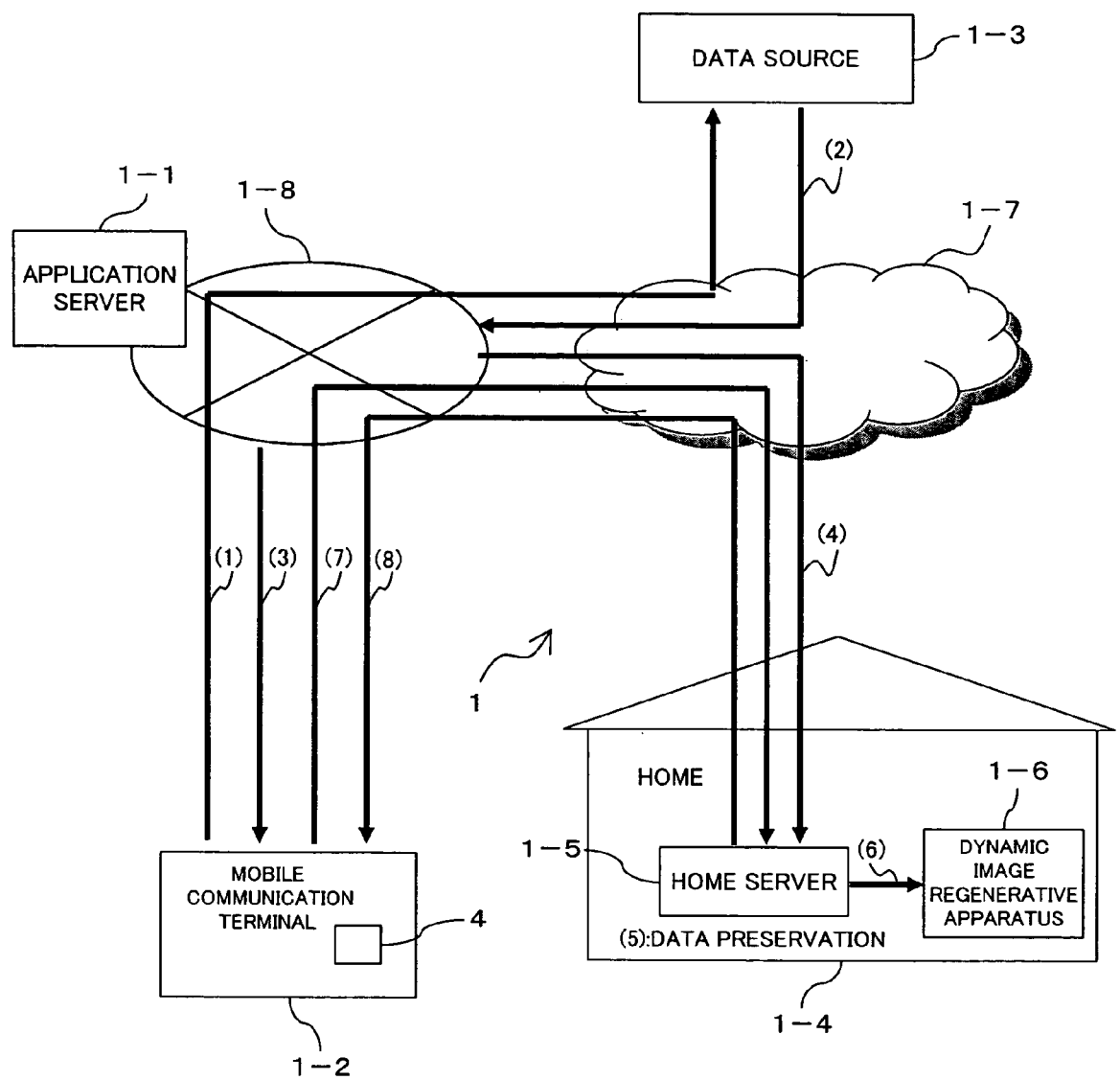
FIG. 1 is a block diagram showing a data communication system according to an embodiment of the present invention.

(a1) About Configuration of Data Communication System According to this Embodiment FIG. 1 is a block diagram showing a data communication system according to an embodiment of the present invention. In FIG. 1, reference numeral 1 represents a data communication system, and this data communication system 1 is made up of an application server 1-1, a mobile communication terminal 1-2 such as a portable telephone and a home server 1-5.

In this configuration, the application server 1-1 is possessed by a mobile communication carrier with which the mobile communication terminal 1-2 makes a subscriber contract and is provided in a mobile communication network 1-8 to be connected through a radio line to the mobile communication terminal 1-2 and further connected through a relatively high-speed line to the internet 1-7. The application server 1-1 can fetch and deliver data such as dynamic images opened to the public on the internet 1-7 in accordance with a request from the mobile communication terminal 1-1.

That is, the application server 1-1 fetches data from a data source 1-3 in accordance with a request from the mobile communication terminal 1-2 and converts the data rate for the delivery to the mobile communication terminal 1-2 to make a delivery. Concretely, the dynamic image data with a relatively high data rate, fetched from the data source 1-3 for a dynamic image delivery service for which a user makes a request, is converted into a relatively low data rate on the basis of a radio band relative to the mobile communication terminal 1-2, the capacity of a transmission line and the capability of the mobile communication terminal 1-2 itself.

In addition, in the application server 1-1, having a configuration forming a feature of the present invention, hereinafter described, transfers a copy of the above-mentioned fetched data to the home server 1-5, provided in a base of a user of the mobile communication terminal 1-2, in a state of a data rate of the original (which can have a relatively high data rate).

Still additionally, the mobile communication terminal 1-2 is a terminal device which can accept a dynamic image service and is capable of giving an instruction to the application server 1-1 for transferring the original dynamic image data from the data source 1-3 to the home server 1-5. Concretely, a delivery request signal outputting unit 4 is provided to output, to the application server 1-1, a delivery request signal designating a location of delivery requested data on the internet 1-7 and a location of the home server 1-5 which is a transferred destination.

Yet additionally, the home server 1-5 is made up of a personal computer (PC) located together with a dynamic image regenerative apparatus 1-6 in a base of the possessor of the mobile communication terminal 1-2, for example, in his/her home 1-4.

This home server 1-5 is connected through the internet 1-7 and a line with a relatively high transmission speed to the application server 1-1 so as to accumulate (backs up) the fetched data transmitted from the application server 1-1 through the internet 1-7. That is, in comparison with the mobile communication terminal 1-2, the hone server 1-5 can process and accumulate data with a higher bit rate. Incidentally, the home server 1-5 can also be directly connected through a dedicated line to the application server 1-1 without using the internet 1-7.

Moreover, the dynamic image regenerative apparatus 1-6 provided together with the home server 1-5 in his/her home 1-4 is connected to the home server 1-5 through the use of i.LINK, RCA connector or the like, and is capable of regenerating the dynamic image data accumulated in the home server 1-5 in accordance with, for example, a regeneration instruction operation by the user as needed. It can be composed of devices such as a television or PC separate from the home server 1-5 or can also be configured through the use of a regenerative function provided in a PC constituting the home server 1-5. This dynamic image regenerative apparatus 1-6 can carry out the dynamic image regeneration with a screen larger than a regenerative screen of the mobile communication terminal 1-2.

Figure 2:
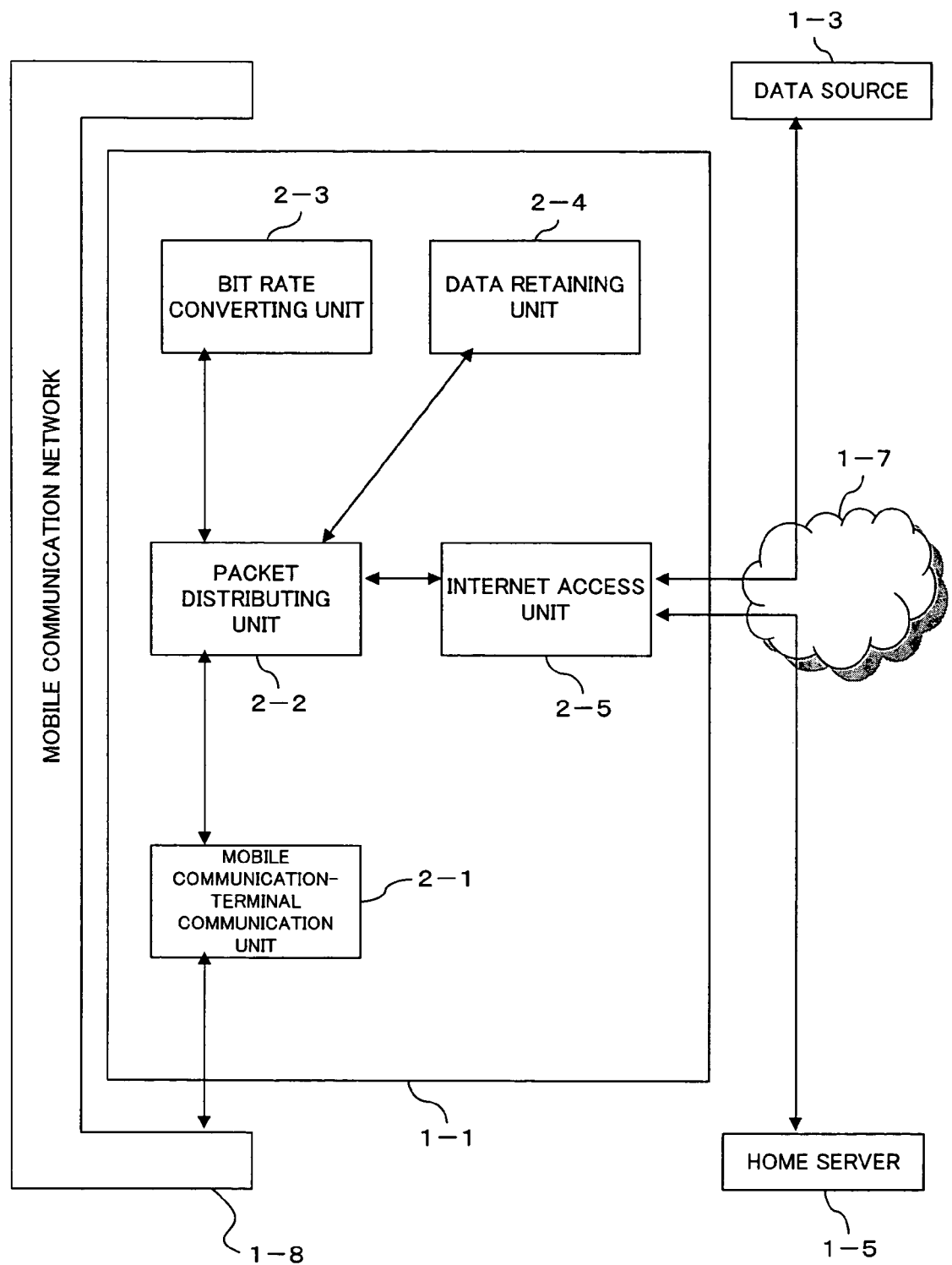
FIGS. 2 and 3 are block diagrams showing essential parts of the data communication system according to the embodiment of the present invention.

FIG. 2 is a block diagram showing a configuration of the aforesaid application server 1-1. As shown in FIG. 2, the application server 1-1 is made up of a mobile communication-terminal communication unit 2-1, a packet distributing unit 2-2, a bit rate converting unit 2-3, a data retaining unit 2-4 and an internet access unit 2-5.

In this configuration, the mobile communication-terminal communication unit 2-1 is made to conduct packet communications with respect to the mobile communication terminal 1-2, and the internet access unit 2-7 is made to conduct internet communications.

Moreover, the packet distributing unit 2-2 has a function to distribute packets, inputted from the external, to a determined processing unit (any one of the mobile communication-terminal communication unit 2-1, the bit rate converting unit 2-4, a data retaining unit 2-6 and the internet access unit 2-7) and a function to hold information on the presence or absence of an instruction for the transfer of packets forming dynamic image data to the home server 1-5.

Still moreover, the bit rate converting unit 2-4 is made to convert the inputted dynamic image data with the original rate into the data with a bit rate according to an instruction from the inputting-side packet distributing unit 2-2 and return it to the packet distributing unit 2-2, and the data retaining unit 2-6 is for once preserving the dynamic image data to be transmitted to the home server 1-5 or the mobile communication terminal 1-2.

In this case, the original rate signifies a speed of the delivery of the dynamic image data managed in the data source 1-3, i.e., the data rate (transfer speed, particularly in the case of the selection of one from a plurality of types of data rates, the maximum speed) before the conversion in the aforesaid bit rate converting unit 2-4.

Figure 3:
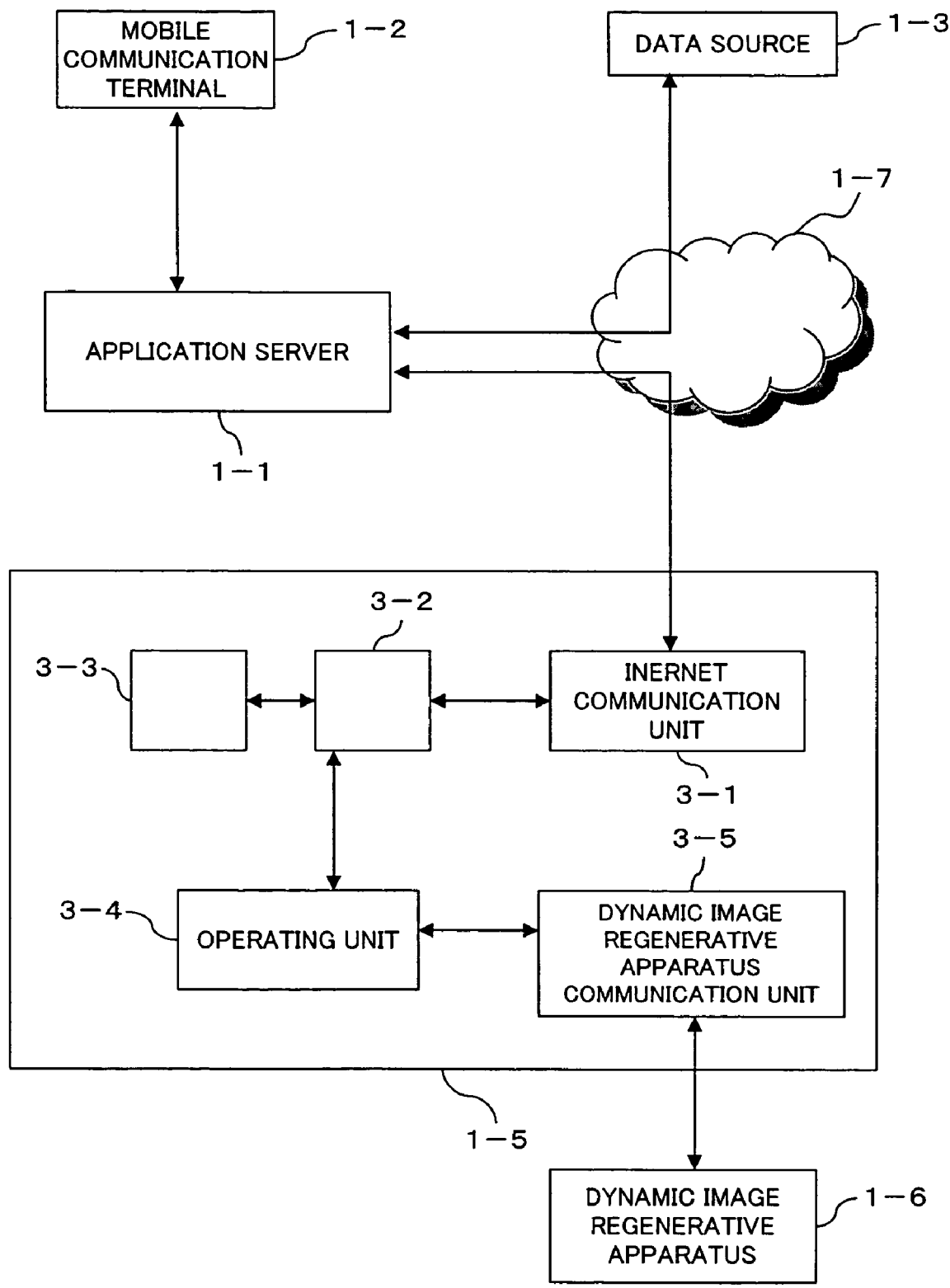

FIG. 3 is a block diagram showing a configuration of the aforesaid home server 1-5. As shown in FIG. 3, the home server 1-5 is made up of an internet communication unit 3-1, a dynamic image processing unit 3-2, a dynamic image storing unit 3-3, an operating unit 3-4 and a dynamic image regenerative apparatus communication unit 3-5.

The internet communication unit 3-1 is connected to the internet 1-7 through a line, for example, xDSL (x Digital Subscriber Line) or the like, which provides a relatively higher speed than that of a line through which the mobile communication terminal 1-2 is connected to the internet 1-7, for making a communication with the application server 1-1 through the internet 1-7.

Moreover, the dynamic image processing unit 3-2 is for carrying out the processing on the dynamic image data. It stores the dynamic image data received through the internet communication unit 3-1 in a storage area allocated as the dynamic image storing unit 3-3 and reads out the dynamic image data stored in the dynamic image storing unit 3-3 to transmit it through the internet communication unit 3-1 to the application server 1-1 or transfer it through the dynamic image regenerative apparatus communication unit 3-5 to the dynamic image regenerative apparatus 1-6.

Still moreover, the operating unit 3-4 functions as a user interface in the home server 1-5, and the dynamic image regenerative apparatus communication unit 3-5 conducts the communications with the dynamic image regenerative apparatus 1-6 through the use of the aforesaid i.LINK, RCA connector or the like.

(a2) Description of Mode of Service Acceptance According to this Embodiment

A description will be given hereinbelow of an operation of the data communication system 1 thus configured according to an embodiment of the present invention.

First of all, as a first service acceptance mode, a description will be given of a processing procedure [see (1) to (6) in FIG. 1] to be conducted until a user uses the mobile communication terminal 1-2, the user carries, at a going-out place to accept a dynamic image service from the data source 1-3 through the application server 1-1 and the internet 1-7 and the dynamic image data backed up into the home server 1-5 by the transfer processing in the application server 1-1 is reproduced by the dynamic image regenerative apparatus 1-6 after his/her return home.

Figure 4:
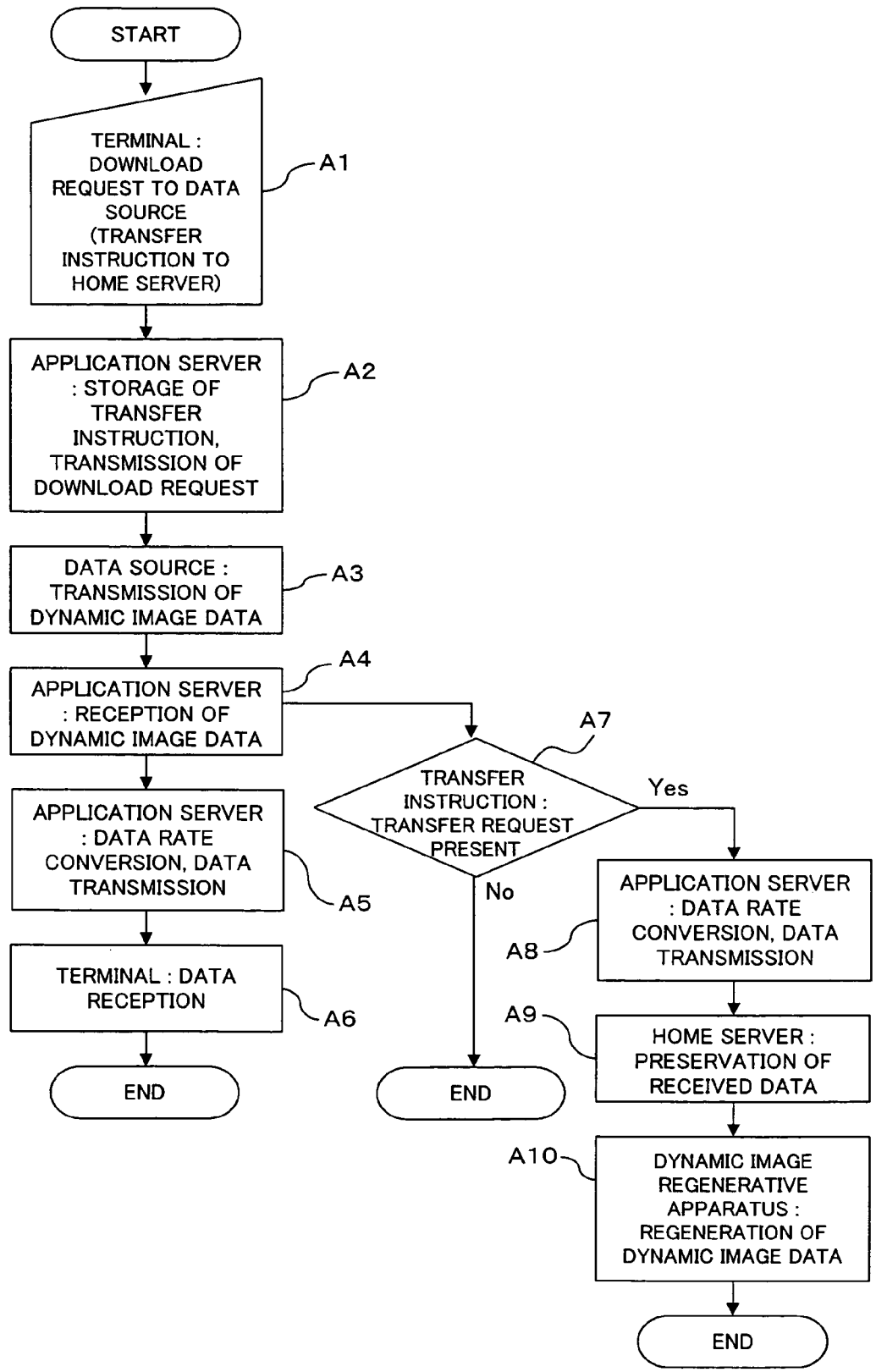
FIGS. 4 and 5 are flow charts for explaining operations of the data communication system according to the embodiment of the present invention.

That is, the mobile communication terminal 1-2 makes a request for the download of dynamic image data by a dynamic image service through the application server 1-1 of a mobile communication carrier and the internet 1-7 to the data source 1-3 such as a server designed to manage data such as home pages [see (1) in FIG. 1, step A1 in FIG. 4].

The information on this download request can include a dynamic image data transferring request from the mobile communication terminal 1-2 to the application server 1-1. That is, as the transfer request to the application server 1-1, the information indicative of the transfer of the dynamic image data to the home server 1-5, together with the information on the designation of the hone server 1-5, can be put in the aforesaid download request.

The packet distributing unit 2-2 of the application server 1-1 stores this transfer instruction and transfers the download request from the internet access unit 2-5 through the internet 1-7 to the data source 1-3.

Concretely, the download request inputted from the mobile communication terminal 1-2 through the mobile communication network 1-8 is received by the mobile communication-terminal communication unit 2-1 of the application server 1-1 and transferred to the packet distributing unit 2-2. The packet distributing unit 2-2 makes a decision that the received packet is addressed to the internet 1-7 and sends this download request from the internet access unit 2-5 through the internet 1-7 to the data source 1-3.

At this time, the packet distributing unit 2-2 stores the instruction on the transfer to the home server 1-5, included in the aforesaid download request [step A2 in FIG. 4]. Incidentally, it is also possible that the aforesaid instruction on the transfer to the home server 1-5 is set by the default at the subscriber contract. In this case, the transfer instruction included in the download request is omitted.

Therefore, the aforesaid steps A1 and A2 constitute a request outputting step of outputting a request for data, opened to the public on the internet 1-7, from the mobile communication terminal 2-1 through the application server 1-1.

The data source 1-3 returns the dynamic image data in accordance with the data request from the application server 1-1. At this time, in a case in which a plurality of dynamic image data ranging from a relatively low bit rate to a relatively high bit rate exist for each dynamic image data deliverable by the data source 1-3, the application server 1-1 can make a request for the delivery of the dynamic image data with the highest bit rate irrespective of the communication environments and capability of the data request outputting terminal. Thus, the data transmission can be made to the data source 1-3, which is a transmitter, without paying attention to the communication environments of the mobile communication terminal 1-2, which is a receiver, and the home server 1-5 or the terminal capability.

In the application server 1-1, when the internet access unit 2-5 receives the dynamic image data corresponding to the download request from the data source 1-3 [steps A3 and A4 in FIG. 4], the packet distributing unit 2-2 makes the data retaining unit 2-4 store a copy of the received dynamic image data and makes the bit rate converting unit 2-3 carry out a conversion on the bit rate (or data rate) of this dynamic image data [step A5 in FIG. 4].

That is, the bit rate converting unit 2-3 converts the dynamic image data from the data source 1-3 into a data rate corresponding to the radio band, the transmission quality and the reception capability of the mobile communication terminal 1-2 or a data rate the user designates and transmits it through the packet distributing unit 2-2 and the mobile communication-terminal communication unit 2-1 [step A5 in FIG. 4]. The mobile communication terminal 1-2 can receive it [step A6 in FIG. 4].

Therefore, the mobile communication-terminal communication unit 2-1, the packet distributing unit 2-2 and the internet access unit 2-5 function as a fetching unit to fetch the data open to the public on the internet 1-7 in accordance with a request from the mobile communication terminal 2-1, while the bit rate converting unit 2-3, the packet distributing unit 2-2 and the mobile communication-terminal communication unit 2-1 function as a first data rate conversion delivery unit to make a data rate conversion on the data fetched by the fetching unit for the delivery to the mobile communication terminal 2-1 and make the delivery to the mobile communication terminal 2-1.

Furthermore, the aforesaid steps A3 to A5 constitute a fetching delivery step in which the application server 1-1 fetches the data corresponding to a request outputted in the request outputting step (steps A1 and A2) and the data rate is converted for the delivery to the mobile communication terminal 2-1, and then delivered.

Still furthermore, the packet distributing unit 2-2, the data retaining unit 2-4 and the internet access unit 2-5, functioning as a transferring unit, transfer the data fetched by the fetching unit to the home server 1-5 on the basis of a delivery request signal from the delivery request outputting unit 4 of the mobile communication terminal 2-1.

Concretely, on the basis of the transfer instruction contents from the mobile communication terminal 1-2 or the transfer instruction contents set by the default, the packet distributing unit 2-2 transmits the dynamic image data with the original rate, retained in the data retaining unit 2-4, from the internet access unit 2-5 through the internet 1-7 to the home server 1-5 the user designates [steps A7 and A8 in FIG. 4]. Thus, the home server 1-5 can receive the data on a better quality according to its own communication environment.

Accordingly, the packet distributing unit 2-2, the data retaining unit 2-4 and the internet access unit 2-5 function as a transferring unit to transfer the data fetched by the fetching unit to the home server 1-5, while the aforesaid steps A7 and A8 constitute a transferring step of transferring the data, fetched by the application server 1-1 in the fetching delivery step, to the home server 1-5 located in a base of the possessor of the mobile communication terminal 2-1.

Moreover, in a case in which the instruction on the transfer to the home server 1-5 is set by the default at the subscriber contract with the mobile communication carrier, the mobile communication terminal 1-2 is identified as a subscriber terminal which has received the download request, and the transfer is made to the designated transferred-destination home server 1-5 according to the contract contents.

In this connection, the transfer processing to the home server 1-5 can be conducted simultaneously with the delivery of the after-conversion dynamic image data to the mobile communication terminal 1-2, or it can also be conducted after the delivery of the after-conversion dynamic image data. Furthermore, as the data to be transferred to the home server 1-5, in addition to the dynamic image data with the original rate, in accordance with the communication environment between the application server 1-1 and the home server 1-5 or the terminal capacity of the home server 1-5, the data fetched in the fetching delivery step can also be bit-rate-converted and then transferred to the home server 1-5.

Still moreover, in the transfer processing to the home server 1-5, the packet distributing unit 2-2 receives and monitors the information on a network traffic as a line state with respect to the home server 1-5 from the network access unit 2-5 and, in accordance with a result of the monitor of the network traffic, the packet distributing unit 2-2 and the internet access unit 2-5 transfer the dynamic image data fetched in the fetching delivery step to the home server 1-5 only when the line is in a good state.

That is, the internet access unit 2-5 functions as a traffic monitoring unit to monitor the network traffic with respect to the home server 1-5, while the packet distributing unit 2-2 and the internet access unit 2-5 function as an under-monitor transferring unit to transfer the data fetched by the fetching unit to the home server 1-6 in accordance with a result of the monitor of the traffic relative to the home server 1-5 by the traffic monitoring unit.

This enables the data source 1-3, which is a transmitter, to transmit the data without paying attention to the communication environments of the mobile communication terminal 1-2, which is a receiver, and the home server 1-5 and the terminal capabilities, and further enables receiving the data, transmitted from the data source 1-3 forming the transmitter, on a better quality when the communication environment of the home server 1-5 forming the receiver is in a good condition.

Following this, the home server 1-5 preserves the dynamic image data sent from the application server 1-1 [A9 in FIG. 4]. Concretely, when the internet communication unit 3-1 of the home server 1-5 receives the dynamic image data from the application server 1-1, the dynamic image processing unit 3-2 makes the dynamic image data storing unit 3-3 store the received dynamic image data.

Accordingly, the aforesaid dynamic image processing unit 3-2 functions as an accumulation processing unit to accumulate the data transferred from the application server 1-1 in the dynamic image data storing unit 3-3 serving as a storage area, while step A9 constitutes an accumulation processing step of accumulating the data, transferred in the transferring step (steps A7 and A8), in the storage area 3-3 of the home server 1-5.

In this way, the user of the mobile communication terminal 1-2 can reproduce the dynamic image data preserved in the dynamic image data storing unit 3-3 through the use of the dynamic image regenerative apparatus 1-6 for looking and listening in a manner such that the user operates the operating unit 3-4 after going the home 1-4. That is, in accordance with a regeneration instruction issued through the operating unit 3-4, the dynamic image processing unit 3-2 fetches the dynamic image data retained in the dynamic image data storing unit 3-3 and transfers it from the dynamic image regenerative apparatus communication unit 3-5 to the dynamic image regenerative apparatus 1-6, and the dynamic image regenerative apparatus 1-6 regenerates the transferred dynamic image data.

Therefore, the aforesaid step A10 forms a regenerating step of regenerating the data accumulated in the dynamic image data storing unit 3-3 serving as a storage area in the accumulation processing step A9.

Thus, since the data once fetched by the mobile communication terminal 2-1 can be backed up into his/her own home server 1-5, for the access to the data in the backed-up destination, there is no need to access a remote-connected computer and, hence, it is possible to regenerate the dynamic image without conducting the user authentication which is commonly required for the access to the remote-connected computer.

Furthermore, as a second service acceptance mode, the mobile communication terminal 1-2 has access through the application server 1-1 to the home server 1-5 for calling and regenerating the dynamic image data already transferred to the home server 1-5 according to the above-mentioned sequence, so the user can look and listen it.

Figure 5:
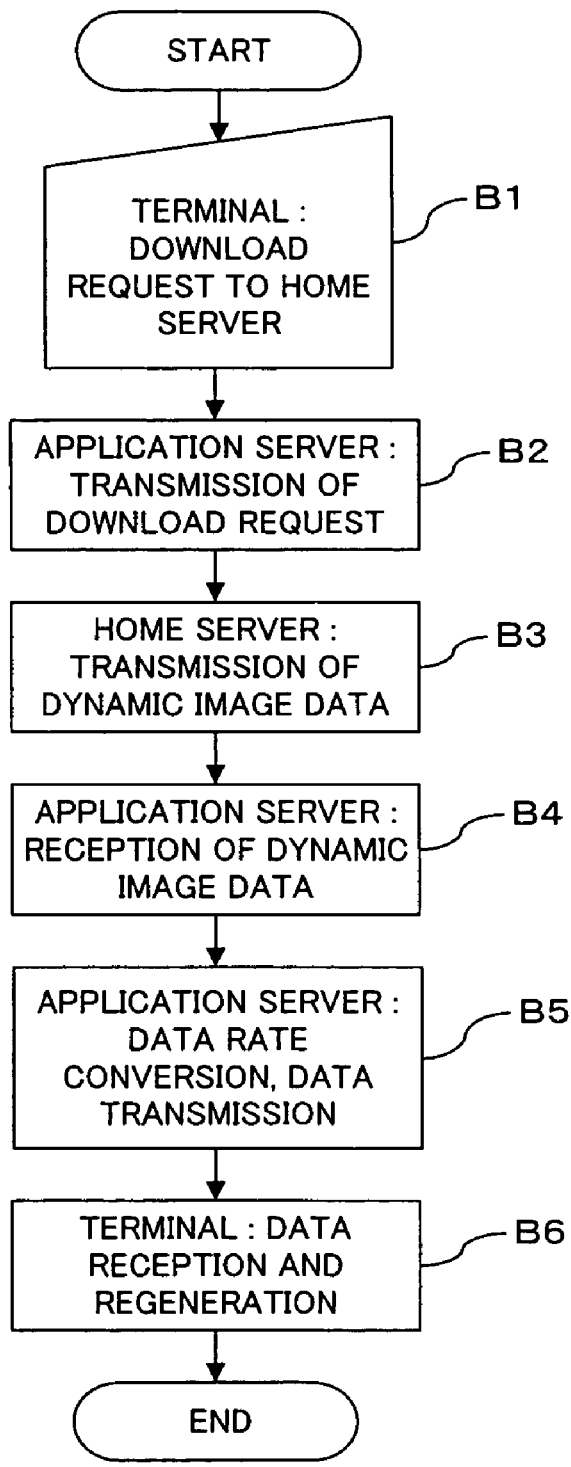

For example, in a case in which the dynamic image data preserved in the home server 1-5 as mentioned above is again regenerated by the mobile communication terminal 1-2 at the movement to a place such as hot spot where the reception condition is good, the access is made from the mobile communication terminal 1-2 through the application server 1-1 to the home server 1-5 [see (7) in FIG. 1 and step B1 in FIG. 5].

That is, when the mobile communication-terminal communication unit 2-1 of the application server 1-1 receives a request for the transfer of the dynamic image data addressed to the home server 1-5, the packet distributing unit 2-2 transmits the aforesaid dynamic image data transfer request through the internet access unit 2-5 to the home server 1-5 [step B2 in FIG. 5].

In other words, the mobile communication-terminal communication unit 2-1, the packet distributing unit 2-2 and the internet access unit 2-5 function as a calling unit to call the data accumulated in the home server 1-5 in accordance with a request from the mobile communication terminal 2-1, and the aforesaid steps B1 and B2 constitute a calling step.

In addition, when the internet communication unit 3-1 of the home server 1-5 receives the aforesaid dynamic image data transfer request from the application server 1-1 through the internet 1-7, the dynamic image processing unit 3-2 reads out the dynamic image data, which is an object of request, from the dynamic image data storing unit 3-3 and returns the dynamic image data, read out, through the internet communication unit 3-1 to the application server 1-1 [step B3 in FIG. 5].

Accordingly, the internet communication unit 3-1, the dynamic image processing unit 3-2 and the dynamic image data storing unit 3-3 function as a reply processing unit to read out the data called by the calling unit of the application server 1-1 from the dynamic image data storing unit 3-3 and make a replay, and the step B3 forms a reply processing step.

When the internet access unit 2-5 of the application server 1-1 receives the dynamic image data, returned by the home server 1-5, through the internet 1-7 [step B4 in FIG. 5], the packet distributing unit 2-2 makes the bit rate converting 2-3 conduct the data rate conversion for the delivery to the mobile communication terminal 1-2. Moreover, the dynamic image data after the data rate conversion is transmitted through the mobile communication-terminal communication unit 2-1 to the mobile communication terminal 1-2 [step B5 in FIG. 5]. Thus, the mobile communication terminal 1-2 regenerates the dynamic image data transmitted from the application server 1-1 [step B6 in FIG. 5].

For example, in a case in which the mobile communication terminal 1-2 regenerates the data from the data source 1-3 in the step A6 of FIG. 4, if the regeneration state is poor because the quality of the radio line or the like is not sufficient at the transfer and when the user again tries to regenerate the dynamic image data at a going-out place after moving to a place such as hot spot where the reception condition is good, the access to the home server 1-5 is conducted as mentioned above, thereby calling and regenerating the dynamic image data. This enables the regeneration of the dynamic image without accessing the data source 1-3 at the re-regeneration, which can lead to the reduction of cost needed for the information delivery.

Accordingly, the internet access unit 2-5, the packet distributing unit 2-2, the bit rate converting unit 2-3 and the mobile communication-terminal communication unit 2-1 function as a data rate conversion delivery unit to, when receiving the data called by the calling unit from the home server 1-5, convert the data rate for the delivery to the mobile communication terminal 1-2 and deliver it to the mobile communication terminal 1-2, and the aforesaid steps B4 and B5 constitute a delivery step.

Among the modes of the regeneration of the dynamic image data, retained in the home server 1-5 as mentioned above, in the mobile communication terminal 1-2, in addition to the mode described above, for example, there is a mode in which, in a case in which a communication is made between the mobile communication terminal 1-2 and a video telephone serving as the data source 1-3, the dynamic image data used in this communication is preserved in the home server 1-5 as described above with reference to FIG. 4 so that the contents can be re-confirmed through the use of the mobile communication terminal 1-2.

Thus, since the data once fetched by the mobile communication terminal 1-2 can be backed up into the home server 1-5 the user possesses, there is no need to carry out the user authentication and others at the access in the home server 1-5 and even the mobile communication terminal 1-2 can gain access to the backed-up data accumulated in the home server 1-5. Therefore, it is possible to omit the user authentication needed when the mobile communication terminal 1-2 gains access to the backed-up data accumulated in a management server of a mobile communication carrier or the like, which contributes greatly to the user's convenience.

Moreover, even in a case in which difficulty is experienced in receiving dynamic image data with a sufficiently high quality or necessary information because of poor mobile communication environments, the receiver can receive the original dynamic image data from the data source at an arbitrary timing without degrading the quality thereof after a change to a good situation of communication environment.

Still moreover, in view of the data source 1-3 side, although a conventional technique requires a data rate conversion by a negotiation on QOS (Quality Of Service) for each transmitting partner before the data transmission, the present invention can eliminate this procedure.

(a3) About Mode of Processing in Each Component in Application Server 1-1 and Home Server Furthermore, a description will be given hereinbelow taking note of, in the above-described first and second service acceptance modes, a processing mode in each component in the application server 1-1 and the home server 1-5.

<About Mobile Communication-Terminal Communication Unit 2-1>

Figure 6:
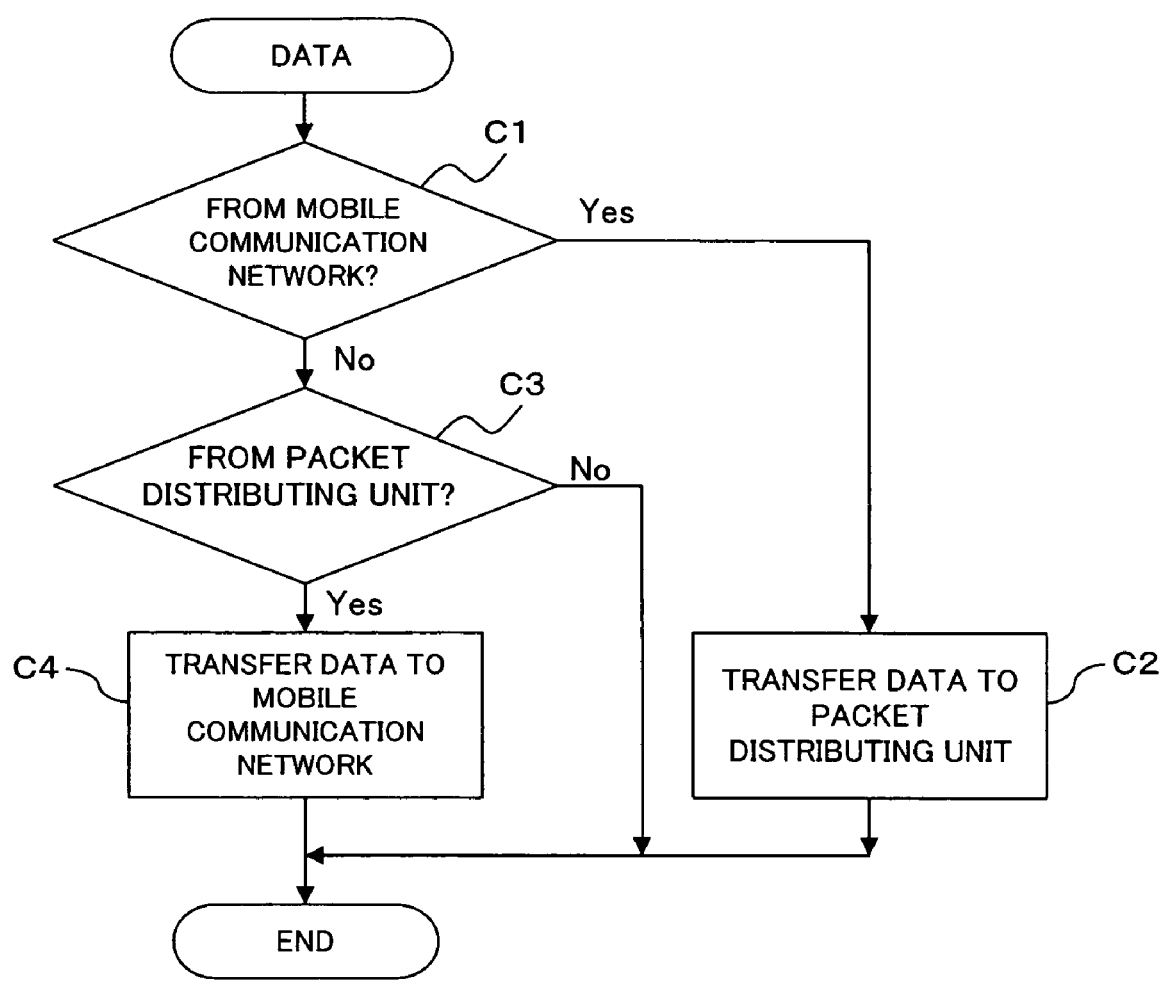
FIGS. 6 to 19 are flow charts for explaining operations of essential parts of the data communication system according to the embodiment of the present invention.

First, the mobile communication-terminal communication unit 2-1 of the application server 1-1 operates as shown in FIG. 6.

That is, in the case of the data reception by the mobile communication-terminal communication unit 2-1, upon receipt of the data from the mobile communication network 1-8 including the mobile communication terminal 1-2, the received data is transferred to the packet distributing unit 2-2 [see step C2 through YES route of step C1, step A2 in FIG. 4 and step B2 in FIG. 5], and in the case of the reception of data from the packet distributing unit 2-2, this data is transmitted to a destination device (mobile communication terminal 1-2 or the like) in the mobile communication network 1-8 [see step C4 through YES route of step C3, step A5 in FIG. 4 and step B5 in FIG. 5].

<About Packet Distributing Unit 2-2>

Subsequently, when receiving data, the packet distributing unit 2-2 of the application server 1-1 distributes packet data as shown in FIGS. 7 to 10.

Figure 7:
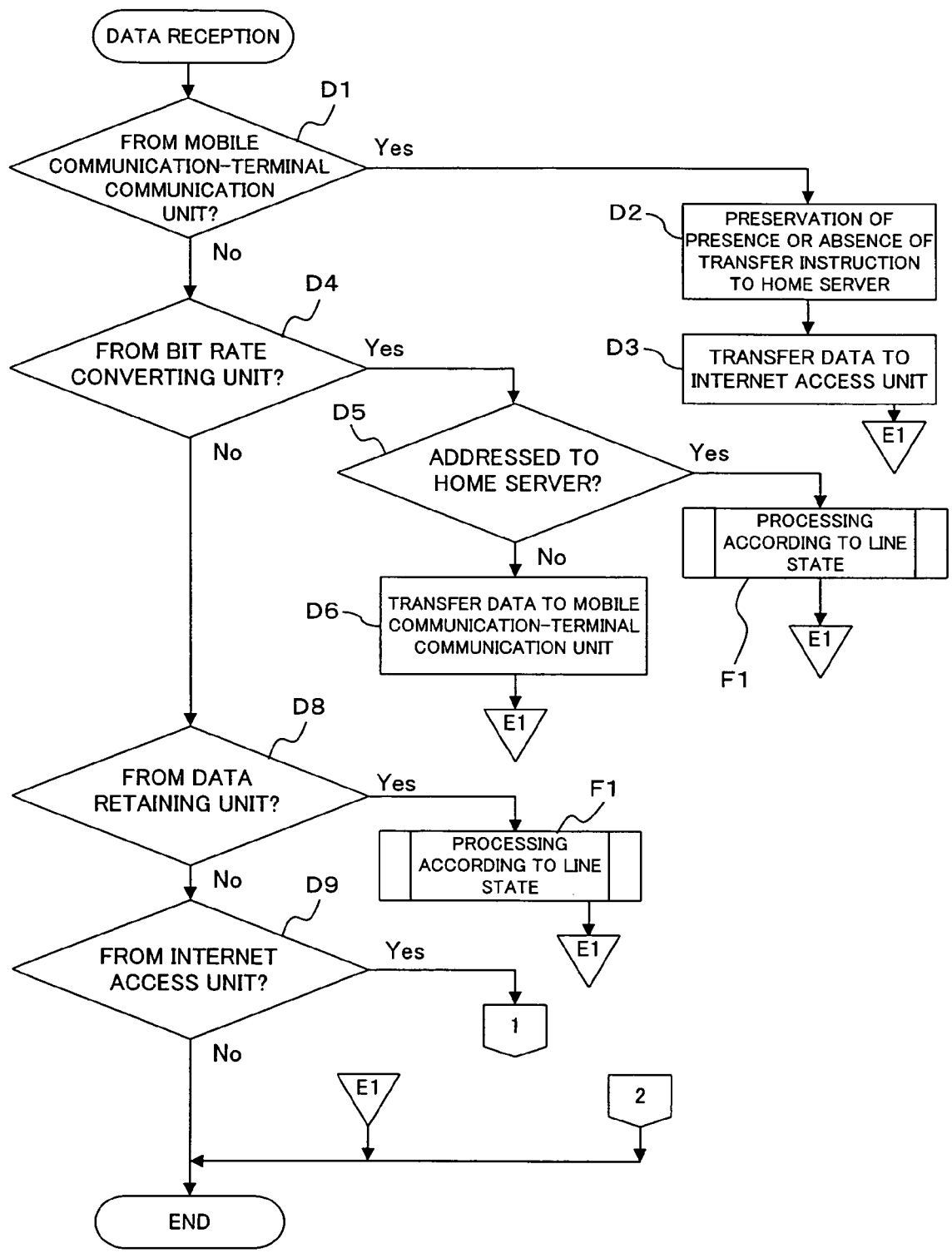

First, when the data received by the packet distributing unit 2-2 is download request data from the mobile communication terminal 1-2, received through the mobile communication-terminal communication unit 2-1 [YES route of step D1 in FIG. 7], the information indicative of the presence or absence of an instruction for the transfer to the home server 1-5, which corresponds to that download request, is preserved [step D2 in FIG. 7] and the download request data is then transferred to the internet access unit 2-5 [see step D3 in FIG. 7, step A2 in FIG. 4 and step B2 in FIG. 5].

On the other hand, in a case in which the data received by the packet distributing unit 2-2 is dynamic image data after the bit rate conversion from the bit rate converting unit 2-3 [YES route of step D4 in FIG. 7], when the destination of this dynamic image data after the bit rate conversion is the mobile communication terminal 1-2, this dynamic image data after the bit rate conversion is transferred to the mobile communication-terminal communication unit 2-1 [see step D6 through NO route of step D5 in FIG. 7, step A5 in FIG. 4 and step B5 in FIG. 5]. If the destination is the home server 1-5, the transfer processing is conducted in accordance with a line condition with respect to the home server 1-5 [see step F1 through YES route of step D5 in FIG. 7 and step A8 through YES route of step A7 in FIG. 4].

Concretely, the packet distributing unit 2-2 monitors the line state with respect to the home server 1-5 in steps D17 to D19 and G1 mentioned later and, when this line state is a ready state, that is, when a good communication is feasible, makes the internet access unit 2-5 transfer the dynamic image data which is an object of transfer for carrying out the processing for the transfer to the home server 1-5 [step F12 through YES route of step F11 in FIG. 9] and, if the line state is a busy state, that is, when the good communication is impossible, it retains the dynamic image data which is an object of transfer in the data retaining unit 2-4 [step F13 through NO route of step F11 in FIG. 9].

Figure 9:
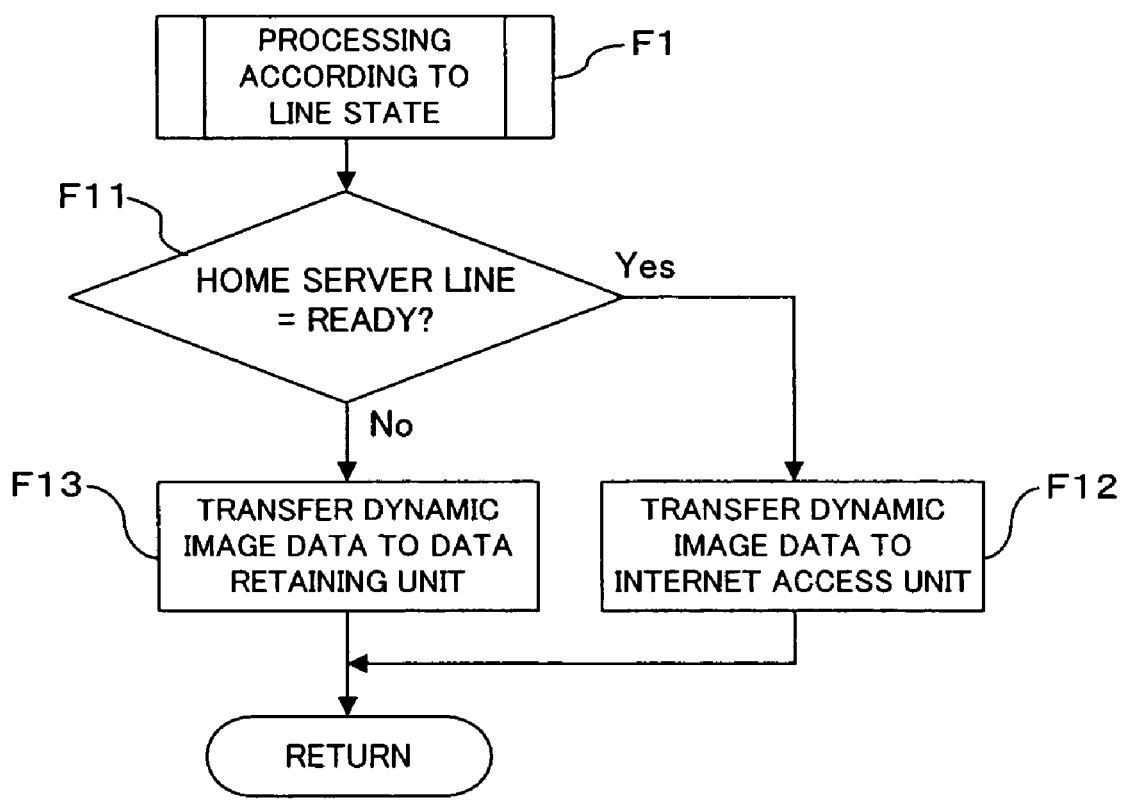
Figure 10:
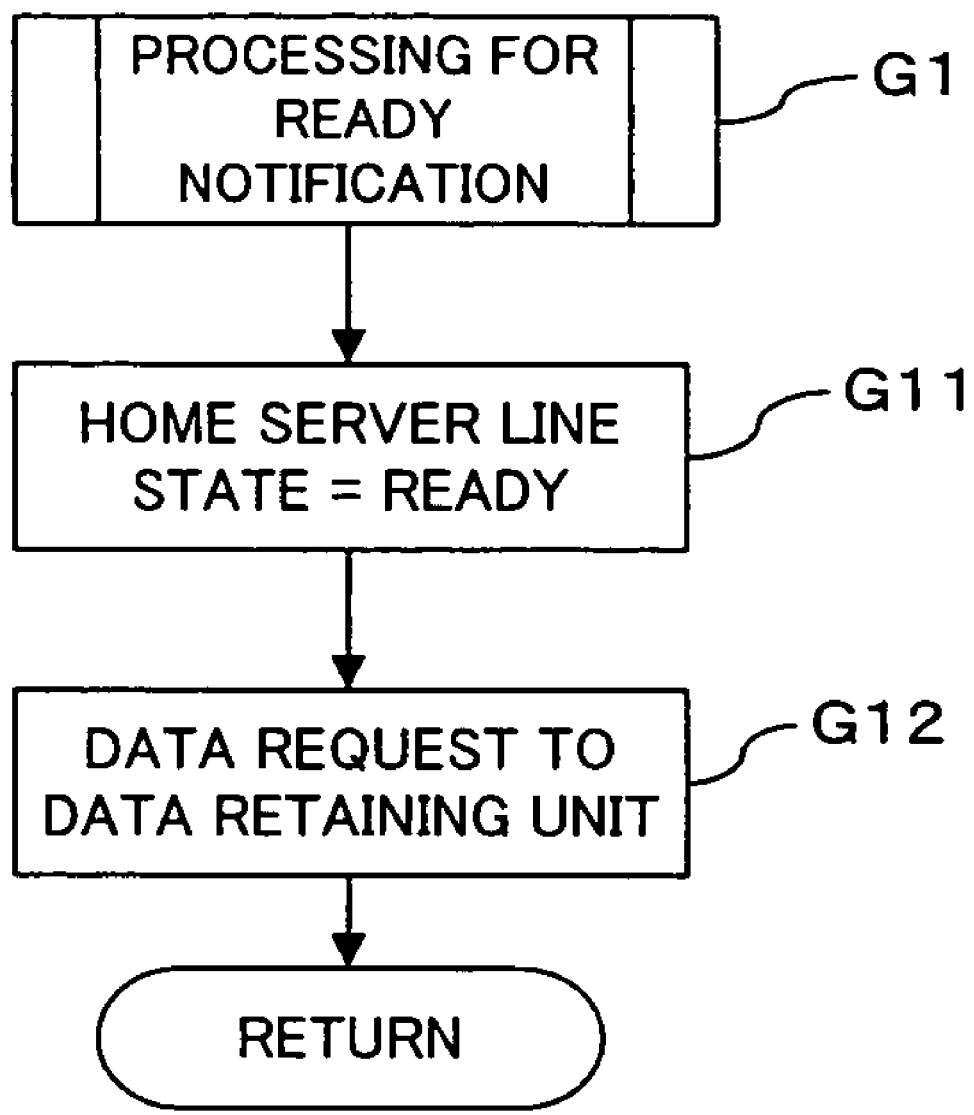

Moreover, in a case in which the data received by the packet distributing unit 2-2 is the dynamic image data retained in the data retaining unit 2-4 [NO route of step D4 and YES route of step D8 in FIG. 7], for the transfer to the home server 1-5 which is a destination of this transferred dynamic image data, as well as the above-mentioned case shown in FIG. 9 (steps F11 to F13), the dynamic image data is transmitted through the internet access unit 2-5 in accordance with a line state [see step F1 through YES route of step D8 in FIG. 7 and step A8 through YES route of step A7 in FIG. 4].

Figure 8:
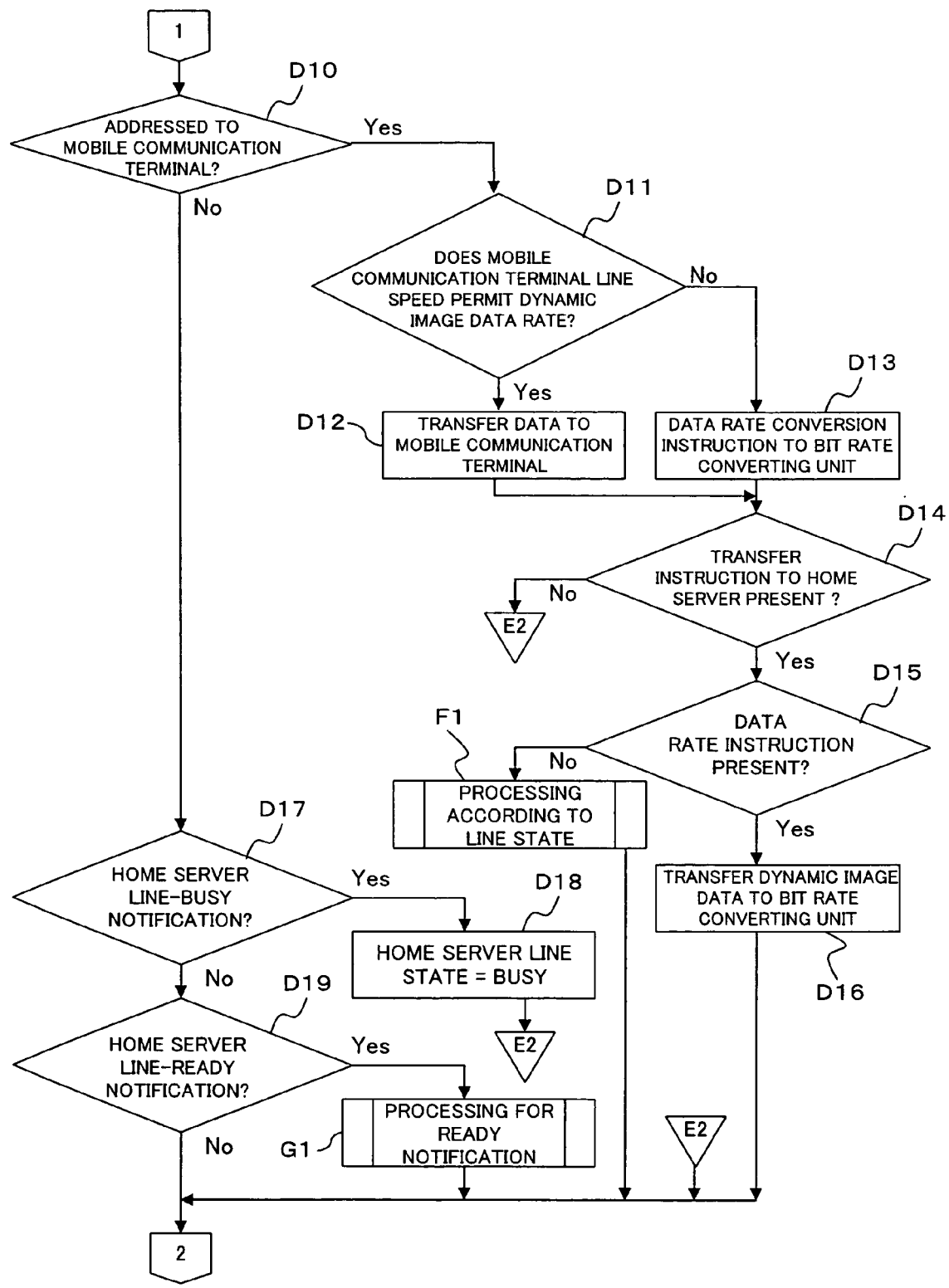

Still moreover, when the data received by the packet distributing unit 2-2 is dynamic image data from the internet access unit 2-5 [through NO route of step D8, YES route of step D9 in FIG. 7], different processing is conducted according to whether the destination device is the mobile communication terminal 1-2 or the home server 1-5 [step D10 in FIG. 8 through YES route of step D9 in FIG. 7].

In a case in which the data from the internet access unit 2-5, received by the packet distributing unit 2-2, is the dynamic image data when the destination is the mobile communication terminal 1-2, a comparison is made between the data rate of the received dynamic image data and the transmission speed of the mobile communication terminal 1-2 which is a transmission destination so as to make a decision as to whether or not this dynamic image data has a data rate which enables the transmission at a transfer speed of the radio line with respect to the mobile communication terminal 1-2 [step D11 through YES route of step D10 in FIG. 8].

That is, when the data rate of the dynamic image data enables the transmission at the transfer speed of the mobile communication network 1-8, the packet distributing unit 2-2 transfers this dynamic image data to the mobile communication-terminal communication unit 2-1 for carrying out the delivery through the mobile communication network 1-8 [step D12 through YES route of step D11 in FIG. 8].

On the other hand, if the data rate of the dynamic image data does not enable the transmission at the transfer speed of the mobile communication network 1-8, the packet distributing unit 2-2 transfers this dynamic image data to the bit rate converting unit 2-3 and the bit rate converting unit 2-3 makes a conversion on the data rate of the dynamic image data so that the transfer can be made at the data rate of the mobile communication network 1-8 [see step D13 through NO route of step D11 in FIG. 8 and step A5 in FIG. 1 or step B5 in FIG. 2].

For example, when the transmission speed of the mobile communication terminal 1-2 is 64 kbps and the bit rate of the dynamic image data is also 64 kbps, the dynamic image data is transferred intact to the mobile communication-terminal communication unit 2-1 for the transmission to the mobile communication terminal 1-2. On the other hand, if the transmission speed of the mobile communication terminal 1-2 is 64 kbps and the bit rate of the dynamic image data is 1 Mbps, the bit rate of the dynamic image data is converted into 64 kbps in the bit rate converting unit 2-3 so that the dynamic image data is transmittable to the mobile communication terminal 1-2.

In addition, an instruction on a copy of the dynamic image data for the transfer to the home server 1-5 is stored [see D2 in FIG. 7] in a state associated with the dynamic image data received from the internet access unit 2-5, the packet distributing unit 2-2 carries out the transfer processing to the home server 1-5 subsequently to (or simultaneously with) the aforesaid transfer processing on the dynamic image data to the mobile communication-terminal communication unit 2-1 or the bit rate converting unit 2-3 [YES route of step D14 in FIG. 8].

In this case, when the dynamic image data transfer instruction to the home server 1-5, corresponding to the dynamic image data, includes an instruction on the data rate of the dynamic image data which is an object of transfer, the packet distributing unit 2-2 transfers the copied data of the dynamic image data received from the internet access unit 2-5 to the bit rate converting unit 2-3 for the conversion into dynamic image data with a bit rate specified [see step D16 through YES route of step D15 in FIG. 8 and step A8 in FIG. 4].

On the other hand, the aforesaid instruction on the data rate is not included in the dynamic image data transfer instruction to the home server 1-5, as well as the above-mentioned case, the packet distributing unit 2-2 carries out the transfer processing to the internet access unit 2-5 or the data retaining unit 2-4 in accordance with a line state with respect to the home server 1-5 [see step F1 through NO route of step D15 in FIG. 8 and step A8 in FIG. 4].

Incidentally, of the data inputted from the internet access unit 2-5 to the packet distributing unit 2-2, with respect to the dynamic image data transmitted from the home server 1-5 through the internet 1-7, no transfer instruction is included in the corresponding download request. In other words, dynamic image data from the home server 1-5 is not transferred to the home server 1-5. This is because this dynamic image data is already accumulated in the dynamic image data transmitting side home server 1-5.

Meanwhile, in a case in which, in the aforesaid step D10, the data inputted from the internet access unit 2-5 to the packet distributing unit 2-2 is a notification on a line state addressed to the packet distributing unit 2-2 with respect to the home server 1-5, the line state is stored in accordance with the notification contents [NO route of step D10].

That is, when receiving, from the internet access unit 2-5, a notification to the effect that the line between the application server 1-1 and the home server 1-5 is in a busy condition, the packet distributing unit 2-2 stores the fact that the line state relative to the home server 1-5 is a busy state [step D18 through YES route of step D17].

Moreover, in a case in which the line between the application server 1-1 and the home server 1-5 is in a ready condition, the packet distributing unit 2-2 stores the fact that the line state relative to the home server 1-5 is a ready condition [step G1 in FIG. 9 through YES route of step D19 subsequent to No route of step D18 in FIG. 8], and outputs a data request to the data retaining unit 2-4 for transferring, to the home server 1-5, the data which is retained in the data retaining unit 2-4 and which is in a transmission waiting state [step G2 in FIG. 9].

<About Bit Rate Converting Unit 2-3>

Figure 11:
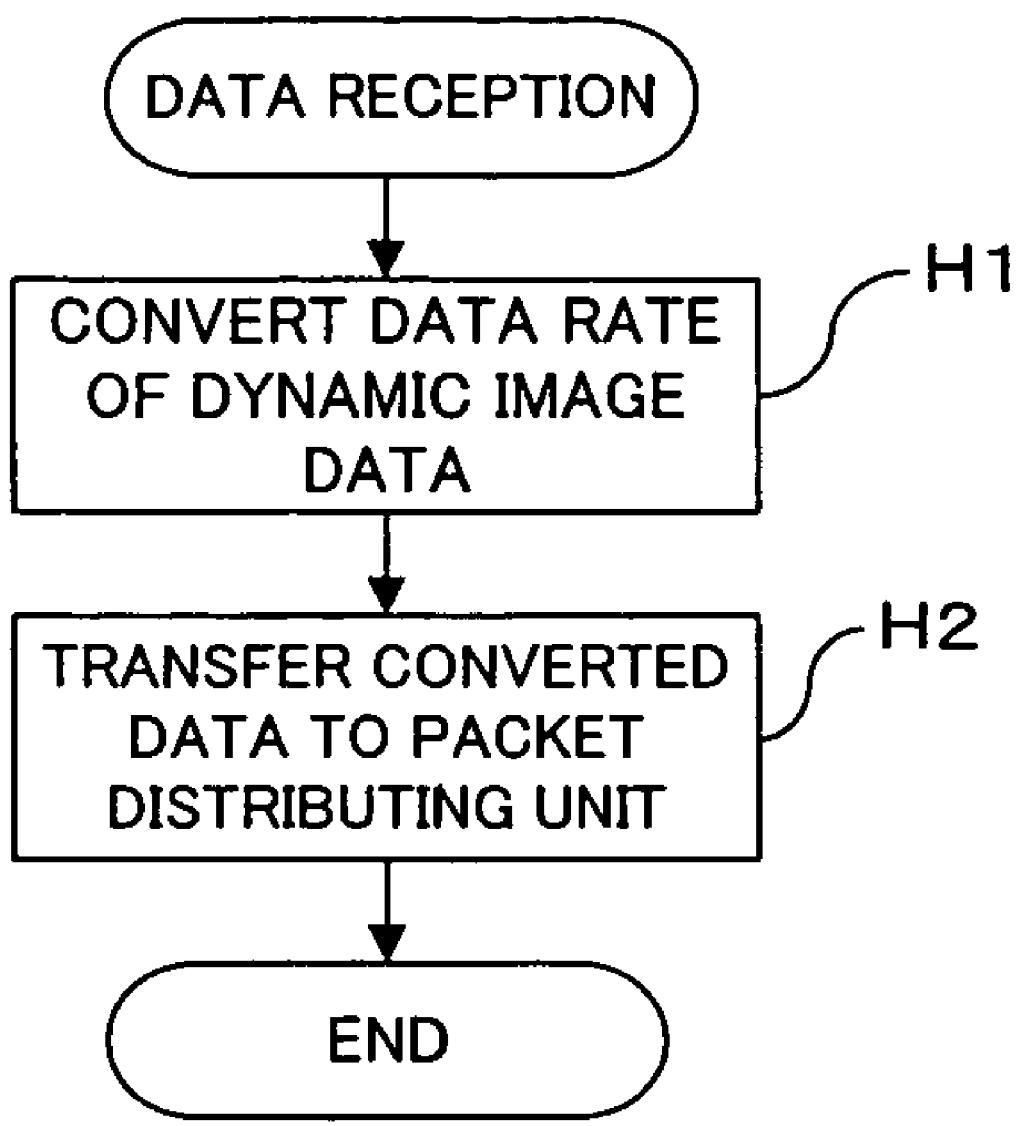

As shown in FIG. 11, when receiving the transferred dynamic image data from the packet distributing unit 2-2, the bit rate converting unit 2-3 converts the bit rate (or data rate) of this dynamic image data into a data rate specified [step H1], and transfers the dynamic image data of the conversion result to the packet distributing unit 2-2 [see step H2, steps A4 and A8 in FIG. 4 and step B5 in FIG. 5].

<About Data Retaining Unit 2-4>

Figure 12:
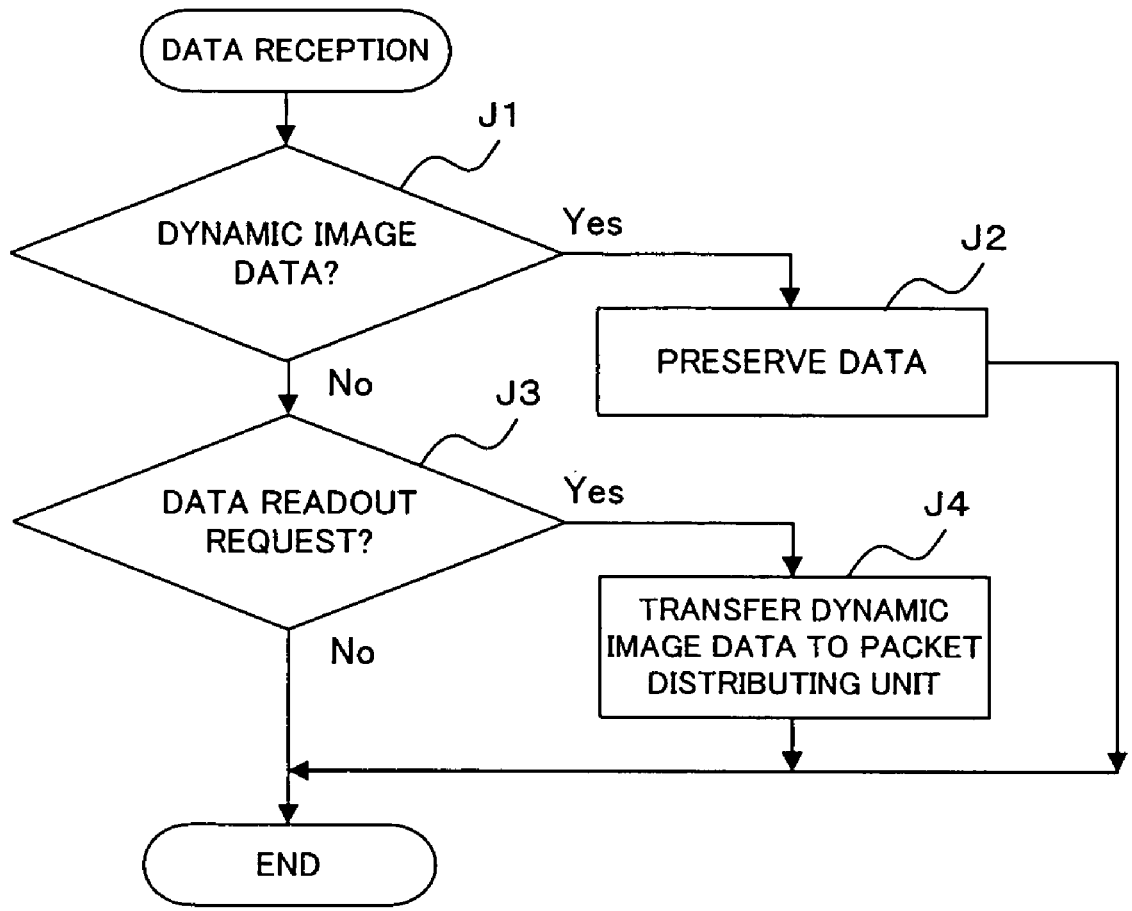

As shown in FIG. 12, when receiving packet data from the packet distributing unit 2-2, if the packet data is dynamic image data, the data retaining unit 2-4 preserves this dynamic image data according to data type of the packet data [see step J2 through YES route of step J1 and step A5 in FIG. 4]. On the other hand, when the packet data is readout request data on dynamic image data retained in this data retaining unit 2-4, the dynamic image data which is an object of the readout request is transferred to the packet distributing unit 2-2 [see step J4 through YES route of step J3 subsequent to No route of step J1 and step A8 in FIG. 4].

<About Internet Access Unit 2-5>

Figure 13:
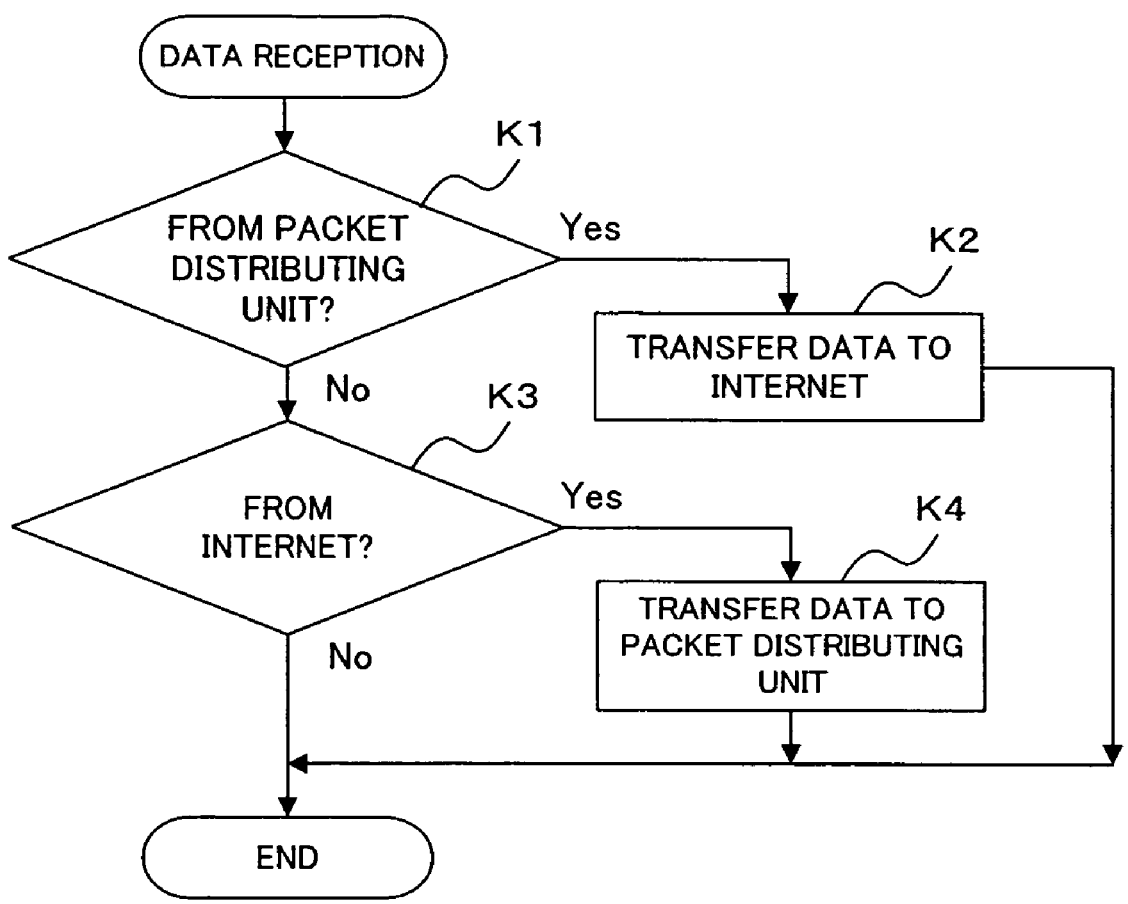
Figure 14:
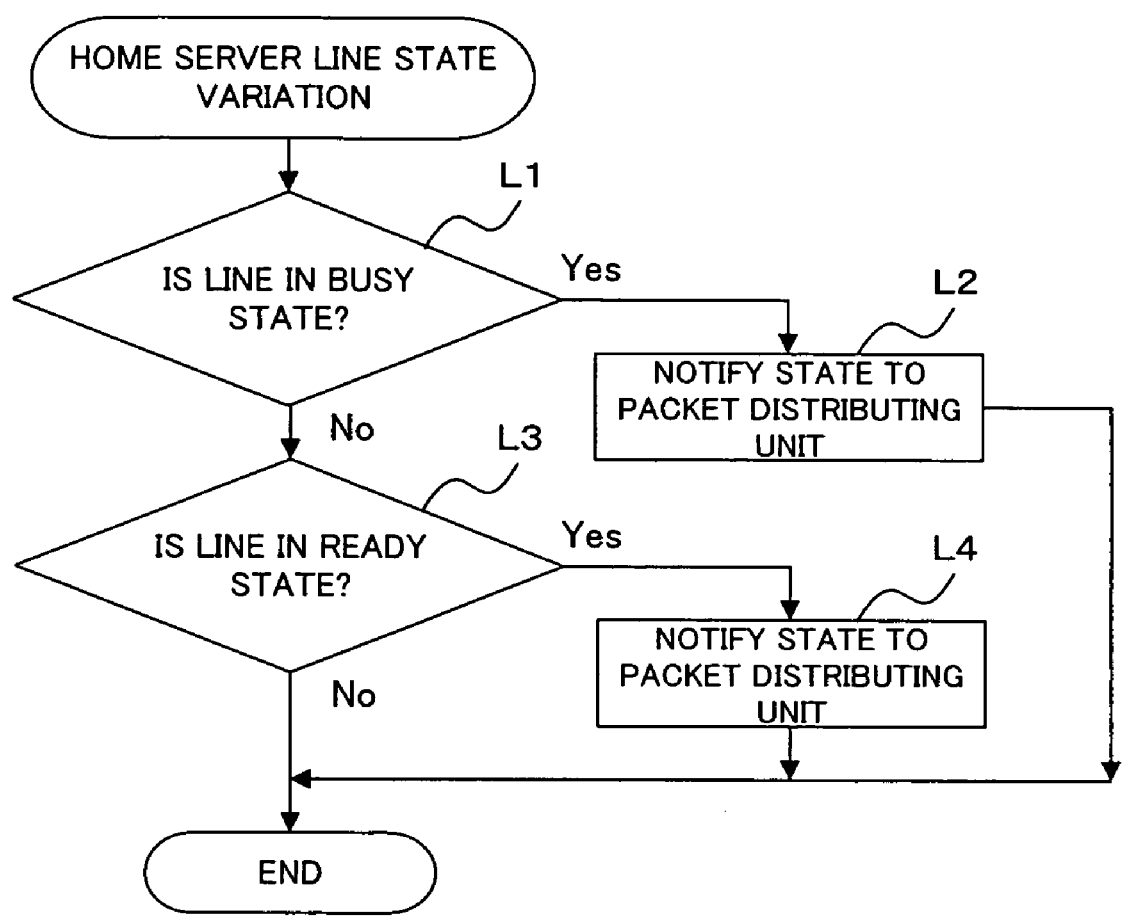
Figure 15:
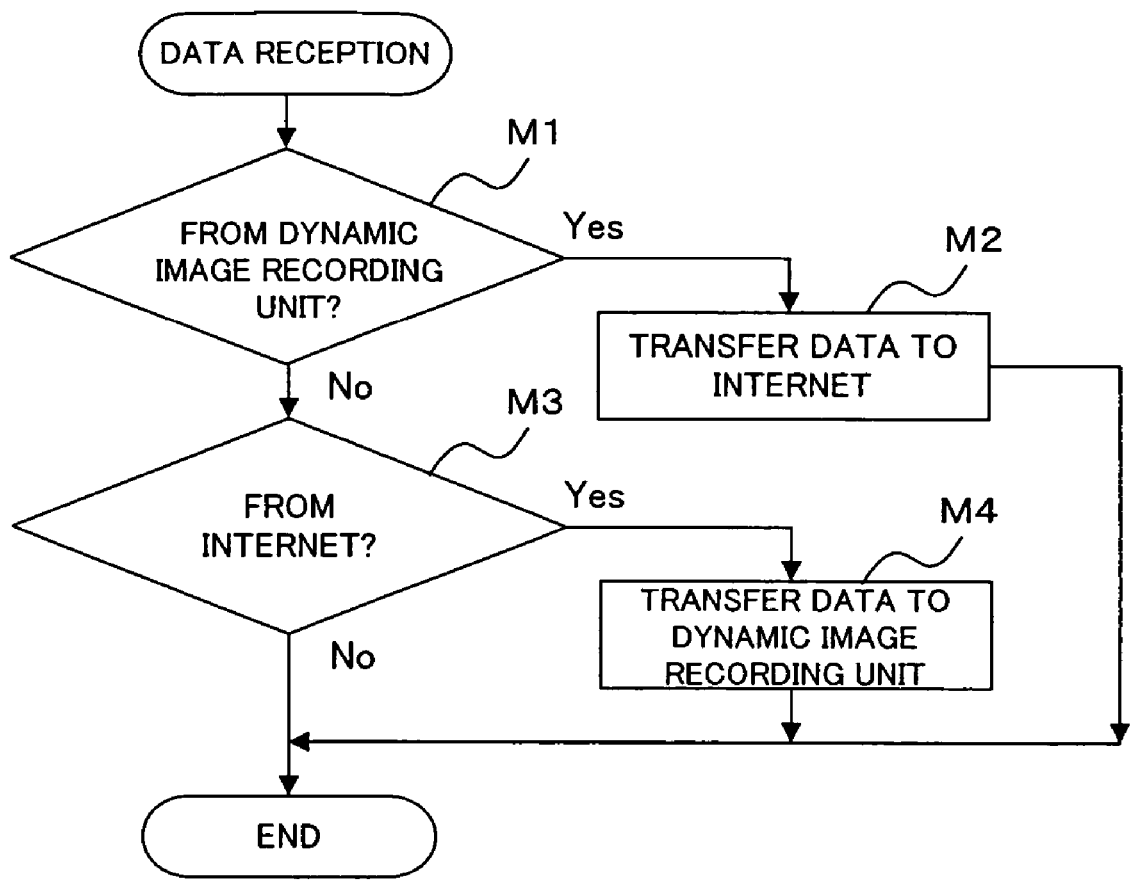

The internet access unit 2-5 carries out the transfer processing at the reception of packet data as shown in FIG. 13, and conducts the line state monitor processing when receiving a notification on a line state of the internet 1-7 making a connection between the home server 1-5 and the application server 1-1 as shown in FIG. 14.

First, as the transfer processing at the reception of packet data, when receiving dynamic image data as transmitted packet data from the packet distributing unit 2-2, the internet access unit 2-5 transmits this dynamic image data through the internet 1-7 to a destination device (in this case, the home server 1-5 [see step K2 through YES route of step K1 in FIG. 13 and step A8 in FIG. 4]. Moreover, when receiving the dynamic image data as packet data from the internet 1-7, the internet access unit 2-5 transfers the dynamic image data to the packet distributing unit 2-2 [see step K4 through YES route of step K3 subsequent to NO route of step K1 in FIG. 13 and steps B4 and B5 in FIG. 5].

In addition, as the line state monitor processing, the internet access unit 2-5 receives, through the internet 1-7, a notification on a line state between the application server 1-1 and the home server 1-5 and notifies the current line state to the packet distributing unit 2-2. Concretely, it notifies a ready state (indicative of a good line state) [step L2 through YES route of step L1 in FIG. 14] or a busy state (state in which a good communication is impossible) [step L4 through YES route of step L3 subsequent to NO route of step L1 in FIG. 14].

<About Internet Communication Unit 3-1>

The internet communication unit 3-1 [see FIG. 3] of the home server 1-5 conducts an operation as shown in FIG. 13.

That is, as the transfer processing at the reception of data, upon receipt of dynamic image data as transmitted packet data from the dynamic image processing unit 3-2, the internet communication unit 3-1 transmits this dynamic image data through the internet 1-7 to the application server 1-1 [see step M2 through YES route of step M1 in FIG. 13 and step B5 in FIG. 5]. Moreover, upon receipt of dynamic image data as packet data for preservation from the internet 1-7, the internet communication unit 3-1 transfers the dynamic image data to the dynamic image processing unit 3-2 for storing it in the dynamic image data storing unit 3-3 [step M4 through YES route of step M3 subsequent to NO route of step M1 in FIG. 13 and step A9 in FIG. 4].

Likewise, even when receiving the information on a data request from the mobile communication terminal 1-2 through the application server 1-1 and the internet 1-7, the internet communication unit 3-1 transfers this data request information to the dynamic image processing unit 3-2 [step M4 through YES route of step M3 subsequent to NO route of step M1 in FIG. 13 and step B2 in FIG. 5].

<About Dynamic Image Processing Unit 3-2>

Figure 16:
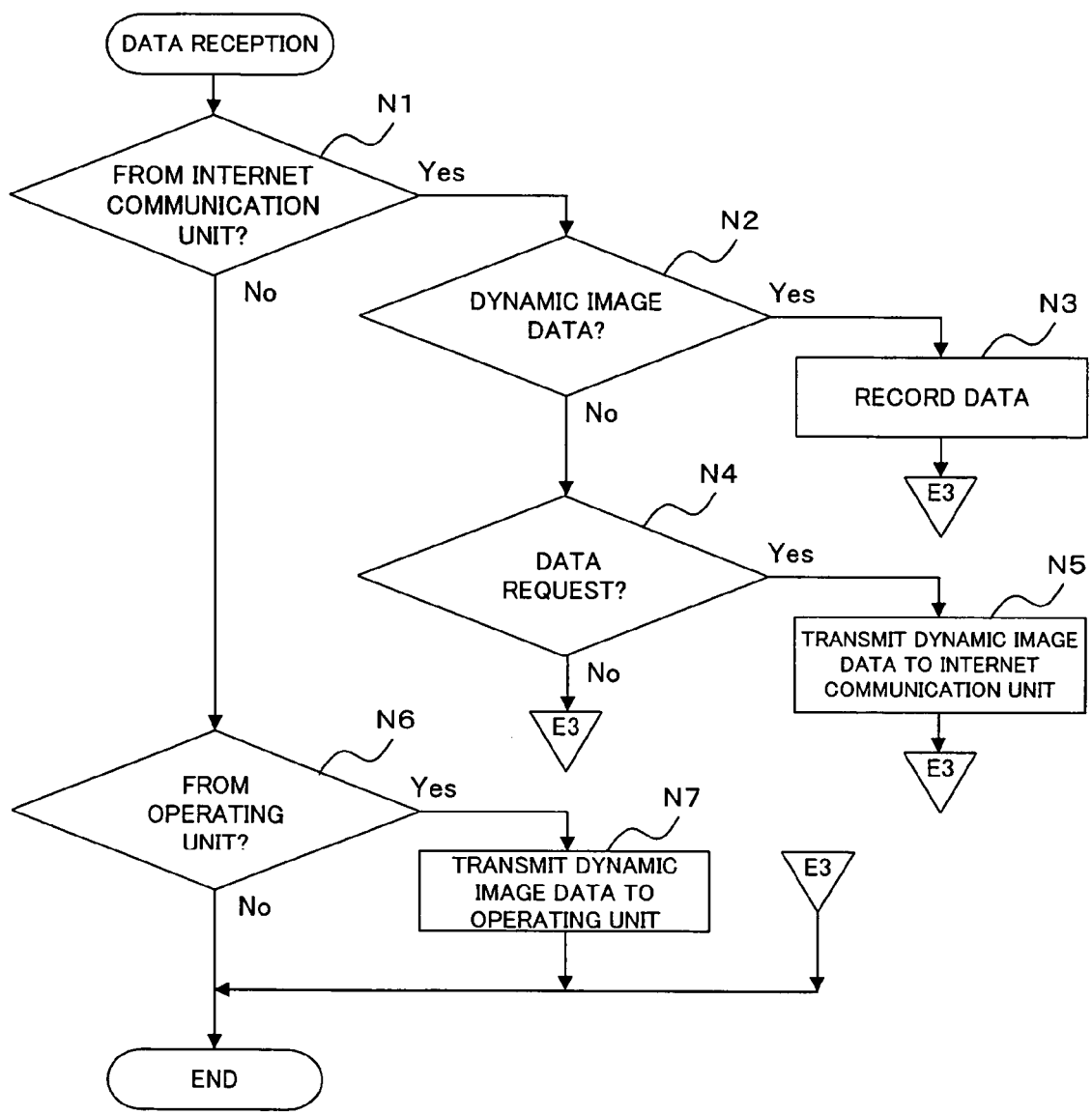

Upon receipt of data, the dynamic image processing unit 3-2 conducts an operation as shown in FIG. 16.

First, upon receipt of data from the internet communication unit 3-1, when this data is dynamic image data for preservation, the dynamic image processing unit 3-2 writes and preserves the received dynamic image data in the dynamic image data storing unit 3-3 [step N3 through YES route of step N2 subsequent to YES route of step N1 in FIG. 13 and step A9 in FIG. 5].

Moreover, when the data received from the internet communication unit 3-1 in the dynamic image processing unit 3-2 is not dynamic image data but it is information on a data request from the mobile communication terminal 1-2 or the like [see step B2 in FIG. 5], the dynamic image processing unit 3-2 reads out the dynamic image data, which is an object of the data request, from the dynamic image data storing unit 3-3 and transmits it to the internet communication unit 3-1 [see step N5 through YES route of step N4 subsequent to NO route of step N2 and step B3 in FIG. 5].

In addition, when the data received by the dynamic image processing unit 3-2 is data for regeneration data request from the operating unit 3-4 but not from the internet communication unit 3-1, the dynamic image processing unit 3-2 reads out the dynamic image data from the dynamic image data storing unit 3-3 on the basis of the designation information on the dynamic image data included in that regeneration data request and transmits it to the operating unit 3-4 [see step N7 through YES route of step N6 subsequent to NO route of step N1 and step A10 in FIG. 4].

<About Operating Unit 3-4>

Figure 17:
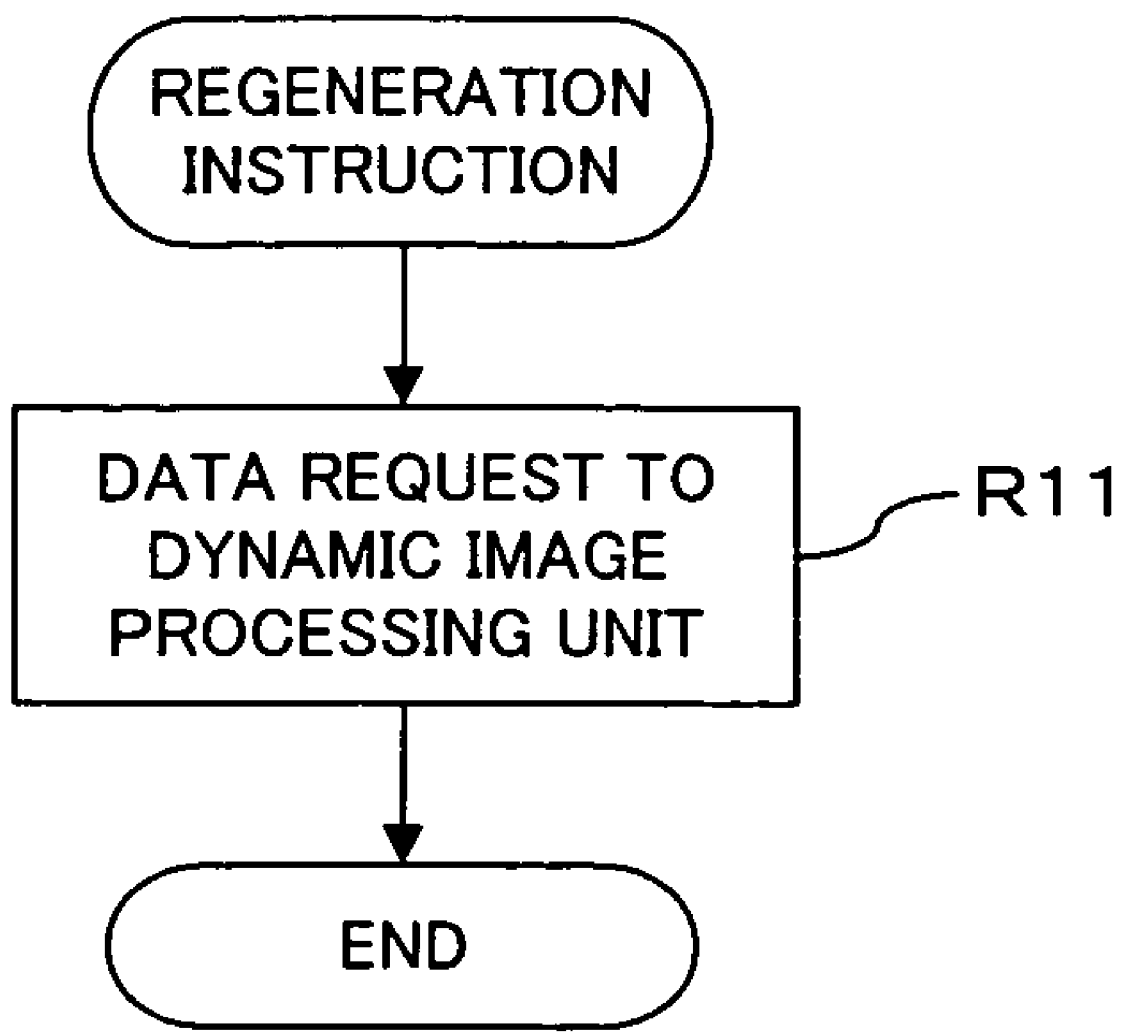
Figure 18:
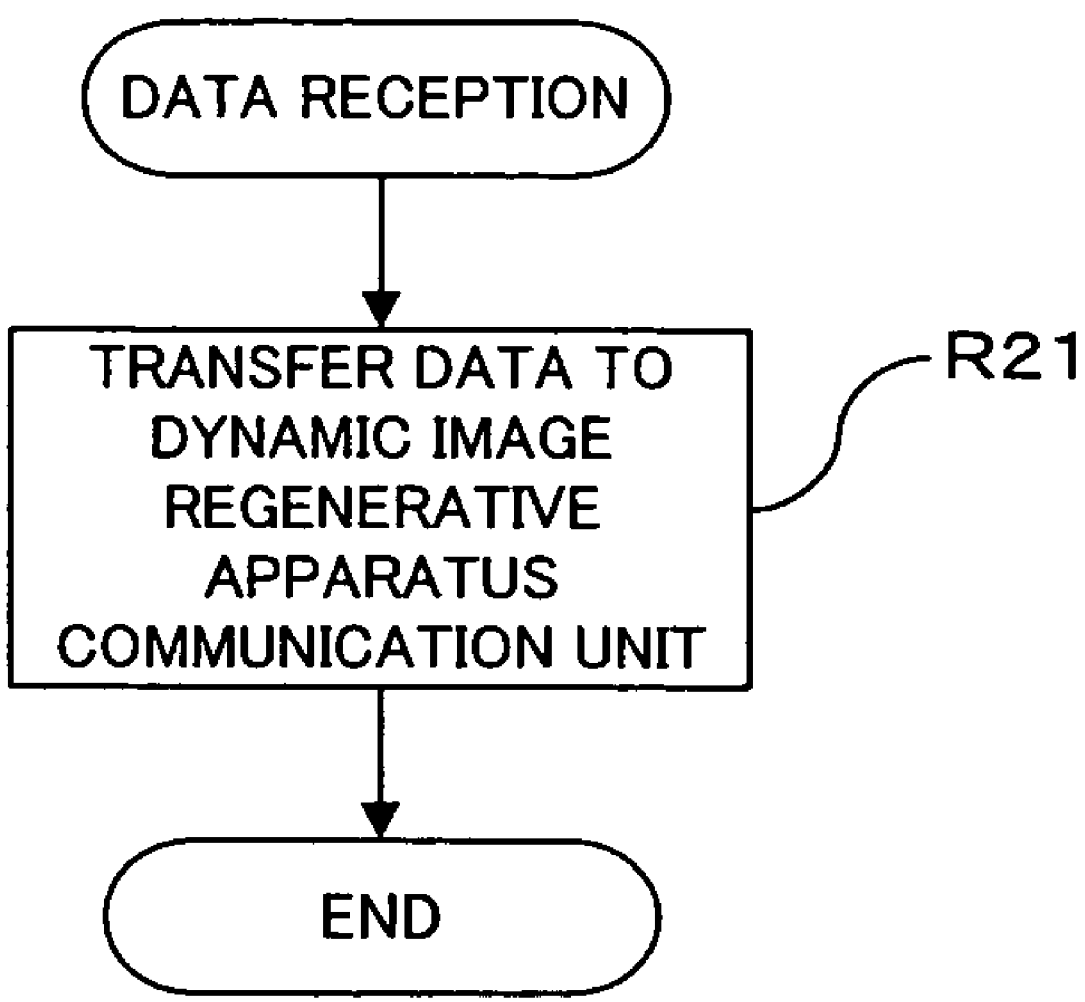

For the aforesaid regeneration processing in the step A10 shown in FIG. 4, when a regeneration instruction operation is made through the operating unit 3-4, this operating unit 3-4 outputs a readout request for dynamic image data, which is an object of regeneration, to the dynamic image processing unit 3-2. Meanwhile [step R11 in FIG. 17], when the regeneration object dynamic image data is read out from the dynamic image processing unit 3-2, the operating unit 3-4 transfers it to the dynamic image regenerative apparatus communication unit 3-5 [step R21 in FIG. 18].

<About Dynamic Image Regenerative Apparatus Communication Unit 3-5>

Figure 19:
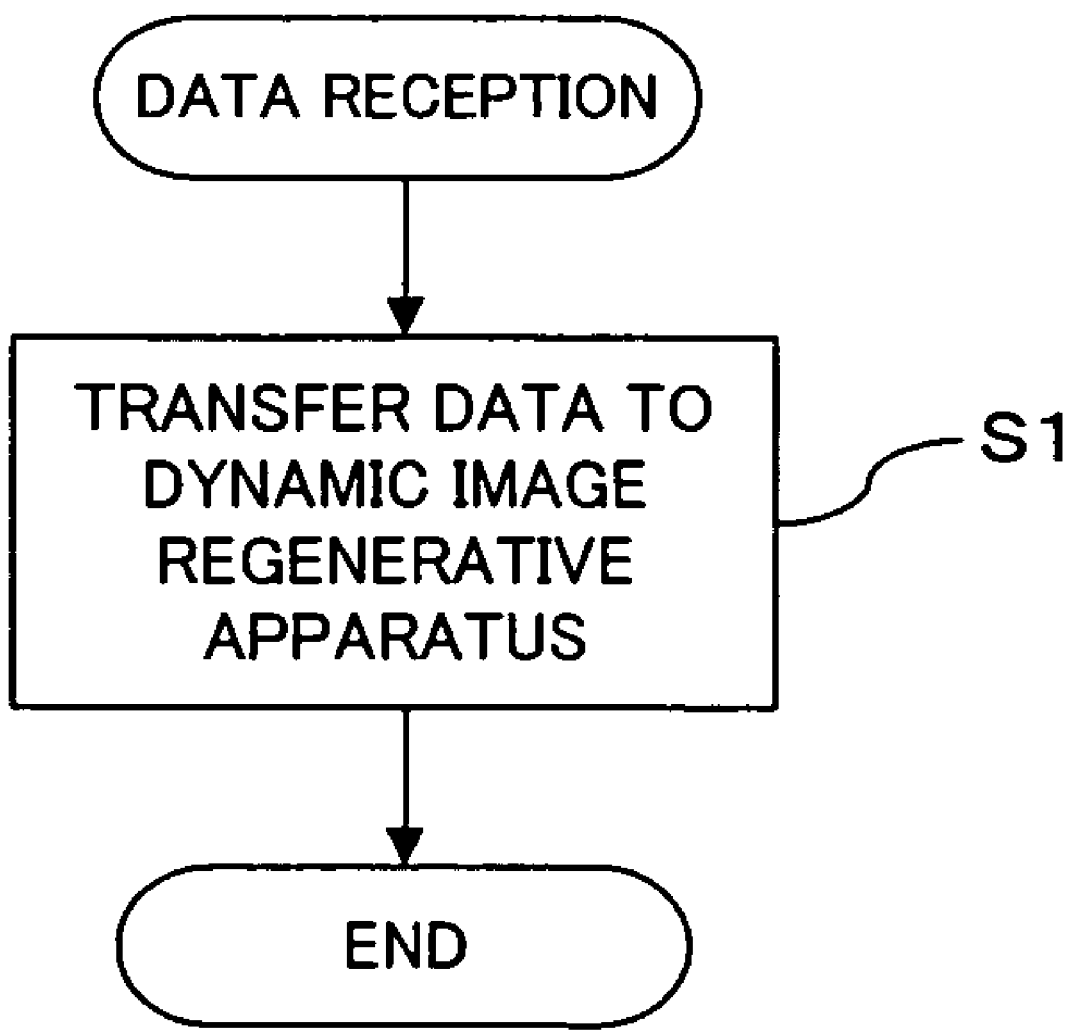

For the aforesaid regeneration processing in the step A10 shown in FIG. 4, when the dynamic image data transferred from the operating unit 3-4 is inputted, the dynamic image regenerative apparatus communication unit 3-5 transfers it to the dynamic image regenerative apparatus 1-6 [step S1 in FIG. 19].

(a4) Conclusion

As described above, when the mobile communication terminal 1-2 makes a download offer request for dynamic image data open to the public on the internet 1-7 through the application server 1-1, the application server 1-1 makes a data size conversion on the dynamic image data fetched from the data source 1-3 so that it is reproducible in the mobile communication terminal 1-2. On the other hand, since the dynamic image can be transferred in a state of a relatively high data rate without converting the data rate, when the data once fetched by the mobile communication terminal 1-2 is made to be reproducible from the home server 1-5, which is his/her own other terminal, without carrying out the user authentication, there is an advantage in that the quality of a dynamic image service to be offered to the user is drastically improvable while maintaining the efficiency of communication data including dynamic images.

In addition, the data once fetched by the mobile communication terminal 1-2 can be backed up into the home server 1-5 the user possesses, at the access in the home server 1-5, there is no need to perform the user authentication, and since the access to the backed-up data accumulated in the home server 1-5 can be made from even the mobile communication terminal 1-2, the user authentication needed for the access to the backed-up data accumulated in a management server of a mobile communication carrier is omissible in the mobile communication terminal 1-2, which contributes greatly to the user's convenience.

Still additionally, even in a case in which difficulty is experienced in receiving dynamic image data with a sufficiently high quality or necessary information because the mobile communication environment is poor, the receiver can receive the original dynamic image data from the data source at an arbitrary timing without degrading the quality thereof after a change to a good situation of communication environment.

Yet additionally, in a case in which a plurality of dynamic image data managed in the data source, which are objects of request, exist according to the magnitude of bit rate, the application server 1-1 can make a request for the delivery of the dynamic image data with the highest bit rate irrespective of the communication environment and capability of the data request outputting terminal so that the data source 1-3, which is a transmitter, can transmit the data without paying attention to the communication environments of the mobile communication terminal 1-2, which is a receiver, and the home server 1-5, or the terminal capabilities.

(b) Others

The present invention is not limited to the above-described embodiments, and covers all changes and modifications of the embodiments of the invention herein which do not constitute departures from the spirit and scope of the invention.

The disclosure of each embodiment of the present invention enables a person skilled in the art to carry out production.

INDUSTRIAL APPLICABILITY

As described above, the data communication system and the data communication method according to the present invention is useful in conducting a service using the transmission/reception of dynamic images such as streaming or the like obtainable by the access to the internet and, in particular, they are suitable for dynamic image delivery service with respect to mobile communication terminals.

The invention claimed is:

1. A data communication system comprising:
a home server;
a mobile communication terminal transmitting a request signal including request information for delivering data stored in a data source in a network to said mobile communication terminal, and request information for transferring the data to said home server;
an application server fetching data open to a public on the network, conducting a data rate conversion for delivery to said mobile communication terminal and conducting data delivery, and transferring the fetched data to said home server, in accordance with information included in the request signal from said mobile communication terminal, wherein said application server fetches requested data requested in the request signal, and the fetched data is of a highest bit rate amount among a plurality of kinds of requested data stored in the data source with bit rates different from each other;
said application server includes:
a fetching unit fetching the data open to the public on said network in accordance with a request from said mobile communication terminal;
a first data rate conversion delivery unit conducting a conversion on the data, fetched by said fetching unit, into a data rate for the delivery to said mobile communication terminal and conducting the delivery to said mobile communication terminal; and
a transferring unit for transferring the data, fetched by said fetching unit, to said home server, and
said home server comprises:
an accumulation processing unit accumulating the data, transferred from said application server, in a storage area; and
a regenerating unit regenerating the data accumulated in said storage area; and
said home server receives data from said application server fetched and transferred through said network, and accumulates received data, wherein
said mobile communication terminal comprises a delivery request signal outputting unit outputting, to said application server, a delivery request signal designating a location of delivery-requested data on said network and a location of said home server which is a transferred destination, and
said transferring unit transfers the data, fetched by said fetching unit, to said home server on the basis of said delivery request signal from said delivery request outputting unit of said mobile communication terminal.

2. The data communication system according to claim 1, wherein said application server comprises:
a calling unit calling the data, accumulated in said home server, in accordance with a request from said mobile communication terminal; and
a data rate conversion delivery unit, upon receipt of the data called by said calling unit from said home server, conducting a data rate conversion for the delivery to said mobile communication terminal and conducting the delivery to said mobile communication terminal, and
said home server comprises:
a reply processing unit reading out the data, called by said calling unit of said application
server, from said storage area and making a reply.

3. The data communication system according to claim 1, wherein a plurality of home servers are provided as said home server and a designation information on a home server which is a transferred destination is included in said request from said mobile communication server.

4. The data communication system according to claim 1, wherein said transferring unit of said application server comprises:
a traffic monitoring unit monitoring a network traffic with respect to said home server; and
an under-monitor transferring unit transferring the data, fetched by said fetching unit, to said home server in accordance with a result of the monitor of the traffic with respect to said home server by said traffic monitoring unit.

5. A data communication method comprising:
outputting a request signal from a mobile communication terminal, the request signal including request information for delivering data stored in a data source in a network to said mobile communication terminal, and request information for transferring the data to a home server;

fetching the data corresponding to said request, and conducting a data rate conversion on the data for delivery to said mobile communication terminal and conducting the delivery in an application server;

transferring the data, fetched by said application server, to said home server;

receiving data transferred and accumulating received data, in said home server, fetching the data open to the public on said network in accordance with a request from said mobile communication terminal;

conducting a conversion on the fetched data into a data rate for the delivery to said mobile communication terminal and conducting the delivery to said mobile communication terminal; and transferring the fetched data to said home server, and said home server:
  accumulates the data, transferred from said application server, in a storage area;
  regenerates the data accumulated in said storage area; and
  receives data from said application server fetched and transferred through said network, and accumulates received data, wherein said application server fetches requested data requested in the request signal, and the fetched data is of a highest bit rate among a plurality of kinds of requested data stored in the data source with bit rates different from each other, said mobile communication terminal outputs a delivery request signal outputting, to said application server, a delivery request signal designating a location of delivery-requested data on said network and a location of said home server which is a transferred destination, and transferring the data fetched by said application server to said home server on the basis of said delivery request signal from said mobile communication terminal.

6. The data communication method according to claim 5, wherein the data fetched is transferred to said home server after a bit rate conversion in accordance with communication environments of said application server and said home server.

7. The data communication method according to claim 5, wherein, a network traffic between said application server and said home server is monitored in said application server and the data fetched is transferred to said home server in accordance with a result of the traffic monitor.

8. The data communication method according to claim 5, further comprising:
  in said application server, calling the data, accumulated in said home server, in accordance with a request from said mobile communication terminal;
  in the home server, reading out the data called from said storage area to make a reply to said application server; and
  in said application server, upon receipt of the data of the reply from said home server, conducting a data rate conversion on the reply data for delivery to said mobile communication terminal, and conducting the delivery to said mobile communication terminal.

* * * * *